(12) United States Patent
Seul

(10) Patent No.: US 12,518,091 B2
(45) Date of Patent: Jan. 6, 2026

(54) SEMANTIC DATA ACQUISITION, STORAGE AND PRESENTATION SYSTEM

(71) Applicant: BioInventors & Entrepreneurs Network, LLC, Warren, NJ (US)

(72) Inventor: Michael Seul, Basking Ridge, NJ (US)

(73) Assignee: BioInventors & Entrepreneurs Network, LLC, Warren, NJ (US)

( * ) Notice: Subject to any disclaimer, the term of this patent is extended or adjusted under 35 U.S.C. 154(b) by 0 days.

(21) Appl. No.: 19/199,903

(22) Filed: May 6, 2025

(65) Prior Publication Data

US 2025/0298975 A1   Sep. 25, 2025

Related U.S. Application Data

(63) Continuation of application No. 17/544,420, filed on Dec. 7, 2021, now Pat. No. 12,340,173, which is a
(Continued)

(51) Int. Cl.
| | |
|---|---|
| *G06F 40/221* | (2020.01) |
| *G06F 8/30* | (2018.01) |
| *G06F 40/131* | (2020.01) |
| *G06F 40/134* | (2020.01) |
| *G06F 40/143* | (2020.01) |
| *G06F 40/154* | (2020.01) |
| *G06F 40/186* | (2020.01) |
| *G06F 40/30* | (2020.01) |

(Continued)

(52) U.S. Cl.
CPC .......... *G06F 40/221* (2020.01); *G06F 40/186* (2020.01); *G06F 40/30* (2020.01); *G06N 5/022* (2013.01); *G06F 8/30* (2013.01); *G06F 8/31* (2013.01); *G06F 40/131* (2020.01); *G06F 40/134* (2020.01); *G06F 40/143* (2020.01); *G06F 40/154* (2020.01); *H04L 67/02* (2013.01)

(58) Field of Classification Search
CPC ............ G06F 40/143; G06F 8/30; G06F 8/31; G06F 40/131; G06F 40/134; G06F 40/154; G06F 40/221; G06F 40/186; G06F 40/30; H04L 67/02; G06N 5/022
See application file for complete search history.

(56) References Cited

U.S. PATENT DOCUMENTS

| | | | |
|---|---|---|---|
| 2006/0248445 A1* | 11/2006 | Rogerson ................ | G06F 9/453 |
| | | | 715/234 |
| 2017/0154019 A1* | 6/2017 | Filipský .................. | G06F 40/16 |
| 2017/0351989 A1* | 12/2017 | Langdon .......... | G06Q 10/06315 |

* cited by examiner

*Primary Examiner* — Quoc A Tran
(74) *Attorney, Agent, or Firm* — Eric P. Miravel, JD, LLM

(57) ABSTRACT

The invention relates to a semantic data acquisition, storage and presentation system comprising SentenceClasses wherein SentenceClasses comprise SentenceClassLabels and SentenceClassData, each such label in the form of a RelationalPhrase or an alias thereof, and data, for each class, organized in conformance with the class-defining relation, as expressed in the form of the RelationalPhrase. Instantiation of SentenceClasses, by replacing substitution variables in RelationalPhrases with associated items of SentenceClassData, produces Sentences that provides context to the instantiated items. The system of the invention also comprises methods and processes including for: acquiring, transforming and recording data; operating on SentenceClasses including forming new SentenceClasses; and instantiating, rendering and presenting Sentences in human or machine-readable format.

25 Claims, 15 Drawing Sheets

Related U.S. Application Data continuation of application No. 17/072,978, filed on Oct. 16, 2020, now Pat. No. 11,886,797.

(51) Int. Cl.
*G06N 5/022* (2023.01)
*H04L 67/02* (2022.01)

Fig. 2

| Embodiment | Key Characteristics |
|---|---|
| "Sliced" Model | One SentenceClassData table per class, each named ("labeled") by the RelationalPhrase expressing the class-defining relation; one SentenceClassLabel per SentenceClassData table and vice versa; no separate table of of SentenceClassLabels |
| Generalized "Sliced" Model | One or more SentenceClassData tables and a table of SentenceClassLabels, the latter holding RelationalPhrases, along with aliases that name the former |
| Generic Information Model | A single table of SentenceClassData, in generic format, and a table of SentenceClassLabels, the former preferably queried by way of forming temporary "pivot" tables |
| Deductive Database Model | Single ("append-only") table, preferably in E-A-V (or E-A-V-T) format, in the form of a text file holding a collection of "facts" and "rules", queried via Datalog or other declarative language |

FIG. 3A

| X | Y | FK |
|---|---|---|
| Malaria | Plasmodium falciparum | 1 |
| Leprosy | Mycobacterium leprae | 1 |
| Bubonic plague | Yersinia pestis | 1 |

FIG. 3B

| X | Y | Z | FK |
|---|---|---|---|
| CLL | CD5 | Positive | 2 |
| Burkitt lymphoma | CD23 | Negative | 2 |
| Burkitt lymphoma | CD10 | Positive | 2 |
| hairy-cell leukaemia | CD5 | Negative | 2 |
| hairy-cell leukaemia | CD19 | Positive | 2 |
| hairy-cell leukaemia | FMC7 | Positive | 2 |

FIG. 3C

| X | Y | FK |
|---|---|---|
| MA2106-16 | MNS: M+N+S-s+U+ |RH: C-E-c(p)+e(p)+V-hrS+VS+hrB- |KEL: K-k+Kpb+Jsb+ | 3 |
| MA2309-15 | MNS: M+N+S-s+U+ |RH: C(p)+E-c+e+hrS+hrB+|KEL: K-k+Kpb+Jsb+ | 3 |
| MA3172-16 | MNS: M+N-S-s-U(w)+ |RH: C-E-c+e(p)+hrS+hrB+ |KEL: K-k+Kpb+Jsb+ | 3 |

FIG. 4

| FK_SentenceClass | SentenceClass | FK |
|---|---|---|
| 1 | Infectious disease X is caused by organism Y | InfectiousDiseases |
| 2 | Hematologic disorder X is characterized by cell surface marker Y with value Z | HematologicDisorders |
| 3 | Donor X has RBC Antigen Phenotype Y | RBCAntigenPhenotypes |

FIG. 5A

| X | Y | Z | T |
|---|---|---|---|
| MRN_1 | PLT | 150 | 2020-10-17 10:19:47 |
| MRN_1 | WBC | ... | 2020-10-17 10:19:47 |
| MRN_1 | RBC | ... | 2020-10-17 10:19:47 |
| MRN_1 | Hb | ... | 2020-10-17 10:19:47 |
| MRN_1 | PLT | 120 | 2020-10-24 16:29:47 |
| MRN_2 | PLT | 120 | 2020-10-31 14:22:25 |
| MRN_1 | PLT | 50 | 2020-10-31 14:12:25 |
| MRN_1 | PLT | 20 | 2020-11-06 15:22:52 |
| MRN_2 | PLT | 70 | 2020-11-06 14:21:52 |
| MRN_1 | PLT | 10 | 2020-11-08 13:23:22 |
| MRN_2 | PLT | 30 | 2020-11-08 13:03:02 |
| MRN_2 | PLT | 15 | 2020-11-00 17:23:22 |

FIG. 5B

| Y | Description | NormalRange | Units |
|---|---|---|---|
| PLT | Platelets | 150 - 450 | $10^3/mm^3$ |
| WBC | White Blood Cells | 4.5 - 11 | $10^3/mm^3$ |
| RBC | Red Blood Cells | M: 4.3 - 5.9; F: 3.5 - 5 | $10^6/mm^3$ |
| Hb | Hemoglobin | M: 13.6-17.5; F: 12-16 | g/dL |
| PMN | Polymorphic Neutrophils | 1.8 - 7.7 | $10^3/mm^3$ |

FIG. 6

| X | Y | Z | T |
|---|---|---|---|
| Patient_1 | Purpose | Education | 2012-03-01 |
| Patient_1 | Diagnosis | CKD Stage 4, hypertension | 2012-03-01 |
| Patient_1 | Medication | ACE Inhibitors | 2012-03-01 |
| Patient_1 | Purpose | Office Visit | 2012-07-01 |
| Patient_1 | Diagnosis | AKI, CKD Stage 4, hypertension | 2012-07-01 |
| Patient_1 | Procedure | Renal Ultrasound | 2012-07-01 |
| Patient_1 | Medication | ACE Inhibitors, diuretics | 2012-12-01 |
| Patient_1 | Purpose | Office Visit | 2012-12-01 |
| Patient_1 | Diagnosis | CKD Stage 4, hypertension | 2012-12-01 |
| Patient_1 | Medication | ACE Inhibitors, diuretics | 2012-12-01 |
| Patient_1 | Purpose | Hospital | 2013-01-01 |
| Patient_1 | Diagnosis | AKI, CKD Stage 5, hypertension | 2013-01-01 |
| Patient_1 | Medication | ACE Inhibitors, diuretics, statins | 2013-01-01 |

FIG. 7

| FK_SentenceClass | GroupIndex | Variable | Value |
|---|---|---|---|
| 1 | 1 | X | Malaria |
| 1 | 1 | Y | Plasmodium falciparum |
| 1 | 2 | X | Leprosy |
| 1 | 2 | Y | Mycobacterium leprae |
| 1 | 3 | X | Bubonic plague |
| 1 | 3 | Y | Yersinia pestis |
| 2 | 1 | X | CLL |
| 2 | 1 | Y | CD5 |
| 2 | 1 | Z | Positive |
| 2 | 2 | X | Burkitt lymphoma |
| 2 | 2 | Y | CD23 |
| 2 | 2 | Z | Negative |
| 2 | 3 | X | Burkitt lymphoma |
| 2 | 3 | Y | CD10 |
| 2 | 3 | Z | Positive |
| 2 | 4 | X | hairy-cell leukaemia |
| 2 | 4 | Y | CD5 |
| 2 | 4 | Z | Negative |
| 2 | 5 | X | hairy-cell leukaemia |
| 2 | 5 | Y | CD19 |
| 2 | 5 | Z | Positive |
| 2 | 6 | X | hairy-cell leukaemia |
| 2 | 6 | Y | FMC7 |
| 2 | 6 | Z | Positive |
| 3 | 1 | X | MA2106-16 |
| 3 | 1 | Y | MNS: M+N+S-s+U+ \|RH: C-E-c(p)+e(p)+V-hrS+VS+hrB- \|KEL: K-k+Kpb+Jsb+ |
| 3 | 2 | X | MA2309-15 |
| 3 | 2 | Y | MNS: M+N+S-s+U+ \|RH: C(p)+E-c+e+hrS+hrB+\|KEL: K-k+Kpb+Jsb+ |
| 3 | 3 | X | MA3172-16 |
| 3 | 3 | Y | MNS: M+N-S-s-U(w)+ \|RH: C-E-c+e(p)+hrS+hrB+ \|KEL: K-k+Kpb+Jsb+ |

FIG. 8

| PK | H-1 | H-2 | H-3 | Sentence_Class | SQL-Create | SQL-Insert |
|---|---|---|---|---|---|---|
| 1 | 1 | 1 | 1 | Infectious disease X is caused by organism Y | SQL code | SQL code |
| 2 | 2 | 1 | 1 | Hematologic disorder X is characterized by cell surface marker y Y with value of Z | SQL code | SQL code |
| 3 | 3 | 1 | 1 | Donor X has RBC Antigen Phenotype Y | SQL code | SQL code |
| 4 | 1 | 2 | 1 | Disease X shows symptom Y | SQL code | SQL code |
| 5 | 1 | 3 | 1 | Disease X for laboratory test Y produces value Z | SQL code | SQL code |
| 6 | 1 | 3 | 2 | Disease X shows cytogenetics abnormality Y | SQL code | SQL code |

FIG. 9

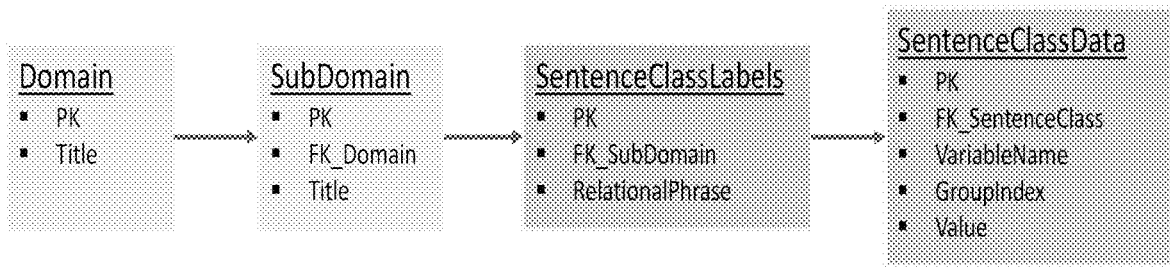

FIG. 10 eav(1_0, label/relPhrase, "Pathogen x causes Disease y").
eav(1_0, label/predicate, "causes(X,Y)").
eav(1_1, x, malaria).
eav(1_1, y, plasmodium_falciparum).
eav(1_1, x/Transmission, vector/mosquito).
eav(1_2, x, leprosy).
eav(1_2, y, mycobacterium_leprae).
eav(1_3, x, bubonic_plague).
eav(1_3, y, yersinia_pestis).
eav(2_0, label/relPhrase, "Hematologic Disorder x has Marker Y with Expression Status Z").
eav(2_0, label/predicate, "isCDExprStatus(X,Y,Z)").
eav(2_1, x, cll).
eav(2_1, y, _CD5).
eav(2_1, z, negative).
eav(2_2, x, burkitt_lymphomanegative).
eav(2_2, y, _CD23).
eav(2_2, z, negative).
eav(2_3, x, burkitt_lymphomanegative).
eav(2_3, y, _CD10).
eav(2_3, z, positive).
eav(2_4, x, hairy_cell_leukemia).
eav(2_4, y, _CD5).
eav(2_4, z, negative).
eav(3_0, label/relPhrase, "Donor X has RBC Antigen Phenotype Y").
eav(3_0, label/predicate, "hasRBCAntigenPhenotype(X,Y)").
eav(3_1, x, _MA2106-6).
eav(3_1, y, "MNS: M+N+S-s+U+ | RH: C-E-c(p)+e(p)+V-hrS+VS+hrB- | KEL: K-k+Kpb+Jsb+").
eav(3_1, y/Special, "VS+hrB-").
eav(3_2, x, _MA2309-15).
eav(3_2, y, "MNS: M+N+S-s+U+ | RH: C(p)+E-c+e+hrS+hrB+ | KEL: K-k+Kpb+Jsb+").
eav(3_3, x, _MA3172-16).
eav(3_3, y, "MNS: M+N-S-s-U(w)+ | RH: C-E-c+e(p)+hrS+hrB+ | KEL: K-k+Kpb+Jsb+").
eav(3_3, y/Special, "S-s-,e(p)").

% rules
eav_xy(X,Y,Z) :- eav(X,Y,Z),Y != x/Gender, Y != x/Ethnicity,
    Y != y/Special,Y != x/Transmission.    % queries to SentenceClassData
eav_defs(X,Y,Z) :- eav(X,Y,Z),Y != x, Y != y.    % queries to other records
eav(2_5, x, hairy_cell_leukemia).
eav(2_5, y, _CD19).

FIG. 11A

| X | Y | A | B | c | D |
|---|---|---|---|---|---|
| CLL | CD19-pos | 23 | 59 | 2 | 154 |
| Burkitt lymphoma | CD10-pos | 19 | 9 | 1 | 114 |
| T-cell leukaemia | CD4-pos | 37 | 9 | 2 | 211 |
| T-cell leukaemia | CD8-pos | 3 | 12 | 36 | 177 |

FIG. 11B

|  | X | not X |
|---|---|---|
| Y | A | b |
| not Y | C | d |

FIG. 12A

| Protasis | Apodosis |
|---|---|
| P: Patient X has presence of pathogenic organism Y.<br>U: Pathogenic organism Y responds to treatment T. | P: Patient X should receive treatment T. |
| P: Patient X takes pharmaceutical substance Y.<br>P: Patient X has genetic variant V.<br>U: In the presence of genetic variant V, pharmaceutical substance Y produces adverse effect E. | P: Patient X is likely to have adverse effect E. |
| P: Recipient X has genotype $G_1$.<br>P: Donor Y has genotype $G_2$.<br>U: Genotype $G_2$ can elicit an adverse immune reaction E against genotype $G_1$.<br>U: This adverse immune reaction mediates graft-versus-host-disease<br>P: Recipient X receives Bone Marrow Transplant from donor Y. | P: Recipient X is likely to have graft-versus-host disease |
| P: Patient X has symptoms [S].<br>U: Patients with symptoms [S] always have disease D. | P: Patient X has disease D. |
| P: Patient X has symptoms [S].<br>U: Patients with symptoms [S] can have disease $D_1$.<br>U: Patients with symptoms [S] can have disease $D_2$. | P: Patient X can have disease $D_1$.<br>P: Patient X can have disease $D_2$. |

FIG. 12B

| | Protasis | Apodosis |
|---|---|---|
| 1 | P: Patient X shows positive results for test S.<br>U: Test S is the screening test for disease D.<br>U: Test C is the confirmatory test for disease D. | P: Patient X should be tested with confirmatory test C. |
| 2 | P: Patient X shows positive results for test C.<br>U: Test C is the confirmatory test for disease D. | P: Patient X has disease D. |
| 3 | P: Patient has disease D.<br>U: The treatment T for disease D. | P: Patient X should receive treatment T. |
| 4 | P: Patient X has disease D and receives treatment T.<br>U: Treatment T in disease D must have response R.<br>P: Patient X has not shown response R to treatment T. | P: Patient X has not disease D. |

FIG. 12C

| | Protasis | Apodosis |
|---|---|---|
| 1 | P: Patient X has symptoms [S].<br>U: Patients with symptoms [S] can have disease $D_1$.<br>U: Patients with symptoms [S] can have disease $D_2$. | P: Patient X can have disease $D_1$.<br>P: Patient X can have disease $D_2$. |
| 2 | P: The differential diagnosis for patient X is [$D_1$, $D_2$].<br>U: Treatment $T_1$ for disease $D_1$ must have response R.<br>P: Patient X has not response R to treatment $T_1$ | P: Patient has not disease $D_1$.<br>P: Patient X has disease $D_2$. |
| 3 | P: Patient X has disease $D_2$.<br>U: The treatment for disease $D_2$ is $T_2$. | P: Patient X should receive treatment $T_2$. |
| 4 | U: Treatment $T_2$ for disease $D_2$ must have response R.<br>P: Patient X has response R to treatment $T_2$ | P: Treatment $T_2$ confirms patient X has disease $D_2$. |

FIG. 14A

| Patient | propPath | propVal | resourceType | id |
|---|---|---|---|---|
| 1 Patient/6231773 | valueQuantity.value | 68 | Observation | 1634594368070 |
| 2 Patient/6231773 | valueQuantity.unit | mg/dL | Observation | 1634594368070 |
| 3 Patient/6231773 | code.text | HDLC | Observation | 1634594368070 |
| 4 Patient/6231773 | referenceRange[0].low.va | 40 | Observation | 1634594368070 |
| 5 Patient/6231773 | referenceRange[0].high.v | 59 | Observation | 1634594368070 |
| 6 Patient/6231773 | subject.reference | Patient/6231773 | Observation | 1634594368070 |
| 7 Patient/6231773 | effectiveDateTime | 7/16/2021 '1:20:00 PM | Observation | 1634594368070 |

FIG. 14B

| PK | Sentence_Class | TableNm |
|---|---|---|
| 1 | Infectious disease X is caused by organism Y | InfectiousDiseases |
| 2 | Hematologic disorder X is characterized by cell surface marker Y with value Z. | HematologicDisorders |
| 3 | Donor X has RBC Antigen Phenotype Y | RBCAntigenPhenotypes |
| 11 | For Mr/Mrs/Ms X, a test of lipid panel component Y produced the value Z at time T | FHIRObs |

FIG. 15A

| | Patient | propPath | propVal | resourceType | id |
|---|---|---|---|---|---|
| 1 | Patient/6231773 | address[0].country | UNITED STATES | Patient | 16347692660043 |
| 2 | Patient/6231773 | address[0].state | **** | Patient | 16347692660043 |
| 3 | Patient/6231773 | address[0].city | **** | Patient | 16347692660043 |
| 4 | Patient/6231773 | address[0].line[0] | **** | Patient | 16347692660043 |
| 5 | Patient/6231773 | address[0].line[1] | Apt **** | Patient | 16347692660043 |
| 6 | Patient/6231773 | address[0].postalCode | **** | Patient | 16347692660043 |
| 7 | Patient/6231773 | gender | male | Patient | 16347692660043 |
| 8 | Patient/6231773 | telecom[1].value | **** | Patient | 16347692660043 |
| 9 | Patient/6231773 | telecom[2].value | **** | Patient | 16347692660043 |
| 10 | Patient/6231773 | birthDate | **** | Patient | 16347692660043 |
| 11 | Patient/6231773 | communication[0].language.coding[0].display | English | Patient | 16347692660043 |
| 12 | Patient/6231773 | identifier[0].value | 6231773 | Patient | 16347692660043 |
| 13 | Patient/6231773 | extension[0].valueCodeableConcept.coding[0].disp | white | Patient | 16347692660043 |
| 14 | Patient/6231773 | name[0].given[0] | **** | Patient | 16347692660043 |

FIG. 15B

FHIR A1C And HDLC Lab Resources Report

Patient

Patient Summary

This report was generated for patient ** **
ID: 6231773
DOB: ****
Gender: male
Ethnicity: White
Language: English
Address: ** Apt , ,  **, UNITED STATES
Email: ****
Phone: ****

Lab Analysis

Lab Analysis Summary

☑ A1C in range
☐ HDLC out of range - high

Lab Result 1

A1C Analysis Results

The A1C-derived average glucose analysis for this patient from 7/16/2021 1:20:00 PM shows a value of 113 mg/dL.

A1C Raw Analysis Data

| Key | Value |
|---|---|
| valueQuantity.value | 113 |
| valueQuantity.unit | mg/dL |
| code.text | A1C-derived average glucose |
| subject.reference | Patient/6231773 |
| effectiveDateTime | 7/16/2021 1:20:00 PM |

Lab Result 2

HDLC Analysis Results

The HDLC analysis for this patient from 7/16/2021 1:20:00 PM shows a value of 68 mg/dL.

HDLC Raw Analysis Data

| Key | Value |
|---|---|
| valueQuantity.value | 68 |
| valueQuantity.unit | mg/dL |
| code.text | HDLC |
| referenceRange[0].low.value | 40 |
| referenceRange[0].high.value | 59 |
| subject.reference | Patient/6231773 |
| effectiveDateTime | 7/16/2021 1:20:00 PM |

SEMANTIC DATA ACQUISITION, STORAGE AND PRESENTATION SYSTEM

BACKGROUND

The representation of domain-specific knowledge in a manner suitable for programmatic exploration is a central problem in many fields including business and medicine.

Graphs, such as the Resource Description Framework ("RDF" see W3.org website, at "Resource Description Framework (RDF)" page) and the related property graphs (see e.g. Herman2019) have received considerable recent attention in this context, building on a foundation of knowledge representation and symbolic logic using graphs (see e.g. Sowa1984). In the RDF data model, binary relations from a "Subject" to an "Object" resource are represented as labeled directed edges from "Subject" to "Object" nodes, such as: Alice —is a friend of →Bob; that is: relations are stored along with the entities to which they refer, obviating the need for "join" operations typically required to extract relations from a relational model. In property graphs, edges as well as nodes carry labels.

In many situations, information of interest in specific domains is conveyed not in free form, but in the form of a small (or in any event finite) set of "stock" phrases that accommodate, in one or more designated positions indicated by variables or wildcards or blanks, the insertion of specific items of information such as names or numeric data or references to other documents or to sources of relevant information.

Such phrases, generalized and formalized herein as RelationalPhrases, including SentenceTemplates or simply Templates, express relations between the inserted items of data or information and thereby contextualize them, and convey meaning.

In many applications, items suitable for insertion into RelationalPhrases are selected from a designated set. For example, the Fast Healthcare Interoperability Resources ("FHIR") messaging standard for communicating health care information defines resources of several types (see hl7.org website at the resourceslist page) whose content is expressed in terms of a specific "vocabulary"—see for example FHIR resource "observation" at the hl7.org website.

There is a need to record and store such items of data or knowledge in a manner that preserves context and meaning and provides a basis for programmatic manipulation including document creation.

This invention provides a system comprising semantic data storage and methods for interacting with this system, preferably using the previously disclosed special purpose language known as jCode, and supporting basic (notably "Create", "Read", "Update" & "Delete") and specific (including "instantiate" or "createNew") methods for manipulating SentenceClasses, as well as configurable workflows for: acquiring data from disparate sources; populating the data storage system; implementing analytical procedures performed on the data; and forming, reporting and rendering instantiated RelationalPhrases including SentenceTemplates in a manner that promotes semantic interoperability between disparate information systems.

SUMMARY

The invention includes a semantic data storage system, also referred to herein as a semantic database or a semantic data store, for recording items of information, including data and knowledge items for instantiating SentenceClasses, each SentenceClass identified by a SentenceClassLabel such as a RelationalPhrase or SentenceTemplate that, when instantiated, provides explanatory context to the instantiating items, and thereby conveys "meaning" and facilitates interpretation. The underlying data model, in one embodiment, comprises at least one table of SentenceClassLabels, holding RelationalPhrases, generally pertaining to a specific domain of knowledge or expertise, and one or more table of SentenceClassData holding items of data or information for instantiating SentenceClasses. In a preferred embodiment, the system is implemented as a relational database accessed by SQL queries; in other embodiments, the system is implemented as a Datalog database or a graph database. This model stores relations along with instantiating items and thereby simplifies queries.

A semantic data acquisition, storage and presentation system comprising the semantic database, and a process for creating, importing, storing and retrieving RelationalPhrases and items of data or knowledge (or pointers thereto) that programmatically (or interactively) instantiates RelationalPhrases and produces structured output, preferably in the form of XML or HTML statements or documents. In connection with the programmatic creation of Data- and KnowledgeStatements, and their (optional) assembly into hierarchically structured documents, as disclosed in "jCode Disclosure", the present invention provides a means of: storing the constituents of these statements in a manner that preserves semantic content; re-constituting stored items in new combinations; and forming new SentenceClasses, notably by inference.

BRIEF DESCRIPTION OF THE FIGURES

FIG. 2 is a table summarizing different embodiments of the SentenceClass model

FIG. 3A is an example of a SentenceClassData table for the SENTENCECLASS: "Infectious disease X is caused by organism Y", with two variables, X and Y, in this case both of type "char"; the table is elsewhere referenced by the name 'InfectiousDiseases'; the foreign key ("FK") points to the table of SentenceClassLabels in FIG. 2

FIG. 3B is an example of a SentenceClassData table for SENTENCECLASS: "For hematologic disorder X, the expression state of cell surface marker Y is Z", with three variables, X, Y and Z, all of type "char"; the table is elsewhere referenced by the name 'HematalogicDisorders'; the foreign key ("FK") points to the table of SentenceClassLabels in FIG. 2

FIG. 3C is an example of a SentenceClassData table for SENTENCECLASS: "Donor X has RBC Antigen Phenotype Y", with two variables, X and Y, where X may be of type numeric (representing a unique numeric or alphanumeric identifier) or type char and Y, representing a string with known separators to facilitate parsing, will be of type char; the table is elsewhere referenced by the name 'RBCAntigenPhenotypes'; the foreign key ("FK") to the table of SentenceClassLabels in FIG. 2.

FIG. 4 is an example of a table of SENTENCECLASSLABELS for the SentenceClassData tables in FIGS. 1A to 1C, where columns 'FK' holds (alias) names of SentenceClassData tables.

FIG. 5A is a Time Series for SENTENCECLASS: "As of date T Date at T_Time, the Y count for patient X was Z" where T_Date and T Time represent components of the DateTime objects in column 'T'. See also the website for Universal Insurance Services Basic Laboratory Tests; Complete Blood Counts (CBC).
The decrease in PLT count below the normal range is an indicator of thromobocytopenia.

FIG. 5B is an 'AttributeDefinitions' table referenced by the SentenceClassData table of FIG. 3A. See also the website for Universal Insurance Services Basic Laboratory Tests; Complete Blood Counts (CBC).

FIG. 6 is an Event Sequences for SENTENCECLASS: "For patient X, the encounter of type Y at time T was characterized by Z" where Y:Z represents a list of attribute: value pairs, with attributes drawn from the set {Purpose, Diagnosis, Procedure, Medication} and values drawn from a vocabulary for characterizing patient office visits (after Tb 1 as in Zhang2015).

FIG. 7 shows the SentenceClassData table in accordance with the generic information model, incorporating the individual tables of SentenceClassData in FIGS. 1A to 1C; the GroupIndex column indicates the grouping of rows, for example, the GroupIndex 1 for FK_SentenceClass 1 indicates that Malaria is caused by Plasmodium falciparum and not by, say, Yersinia pestis.

FIG. 8 is a table of SentenceClassLabels in accordance with the generic information model holding multiple SentenceClasses, including those in in FIGS. 1A (PK=1), 1B (PK=2) and 1C (PK=3); H-1, H-2 and H-3 indicate levels in a hierarchy, the columns 'SQL-Create' and 'SQL-Insert' hold SQL queries further described in the Detailed Description.

FIG. 9 is a diagram for the generic information model

FIG. 10 is an example of a Datalog database comprising: facts embodying (a subset of) the content of the SentenceClassData table in FIG. 7 and the RelationalPhrases from the table of SentenceClassLabels in FIG. 8, plus additional entries, including entity or attribute descriptions such as label/Transmission; and examples of related rules which, in this case, limit queries to SentenceClassData or limit queries to records other than SentenceClassData; facts are represented as eav(Entity, Attribute, Value) triples, wherein "eav" represents a generic predicate, and entities are represented in the form of a unique entity identifier; the attribute "label/RelPhrase" is paired with a RelationalPhrase in the form of a SentenceTemplate; the attribute "label/Predicate" is paired with a RelationalPhrase in the form of a predicate formula; attributes x, y and z refer to SentenceClassData; the symbol "%" indicates a comment.

FIG. 11A is an example of a table for SENTENCECLASS: "Hematologic condition X with expressed cell surface marker Y", comprising, in addition to columns 'X' and 'Y', columns labeled 'a', 'b', 'c' and 'd' holding clinical epidemiological data in accordance with the definition of a 2×2 contingency table.

FIG. 11B is a 2×2 contingency table, to be populated by counts from the Table in FIG. 11A.

FIG. 12A shows several medical interference statements; variables in square brackets indicate arrays, e.g. [S]=set of signs or symptoms; "P" and "U" indicate particular and universal SentenceClasses, respectively.

FIG. 12B shows medical interference statements showing a sequence of steps in the management of patient X; "P" and "U" indicate particular and universal SentenceClasses, respectively.

FIG. 12C. shows a sequence of inference statements relating to differential diagnosis; [S] denotes an array holding signs or symptoms; "P" and "U" indicate particular and universal SentenceClasses, respectively.

FIG. 14A is a data table, in entity-attribute-value ("E-A-V") format, holding data abstracted from Resource of type "Observation", as defined under the Fast Healthcare Interoperability Resources ("FHIR") standard, reporting a lipid panel test result for "HDLC", with 'Patient', 'propPath' and 'prop Val' respectively representing 'Entity', 'Attribute' and 'Value', with supplemental columns 'ResourceType' and 'id', the latter representing a numerically encoded document creation time-stamp.

FIG. 14B is a table of SENTENCECLASSLABELS as in FIG. 4, expanded by an entry referencing (via FK=11) the table in FIG. 14A; entries in column "TableNm" serve as a foreign key referencing individual SentenceClassData tables by name.

FIG. 15A is a SentenceClassData table in E-A-V format holding patient-specific data abstracted from a FHIR Resource of type "Patient", with supplemental columns 'ResourceType' and 'id' (=unique document identifier).

FIG. 15B is a composite HTML document programmatically created by the jCode machine from two separate FHIR resources, the first reporting a test result for "A1C", the second reporting a test result for "HDLC" (see also FIG. 14A); the sections display, in order: a report header with patient information (here redacted); a summary of the combined laboratory test results; a summary of the first individual laboratory test result, for A1C; and a summary of the second individual laboratory test result, for HDLC.

DETAILED DESCRIPTION

Definitions

Figure 1:
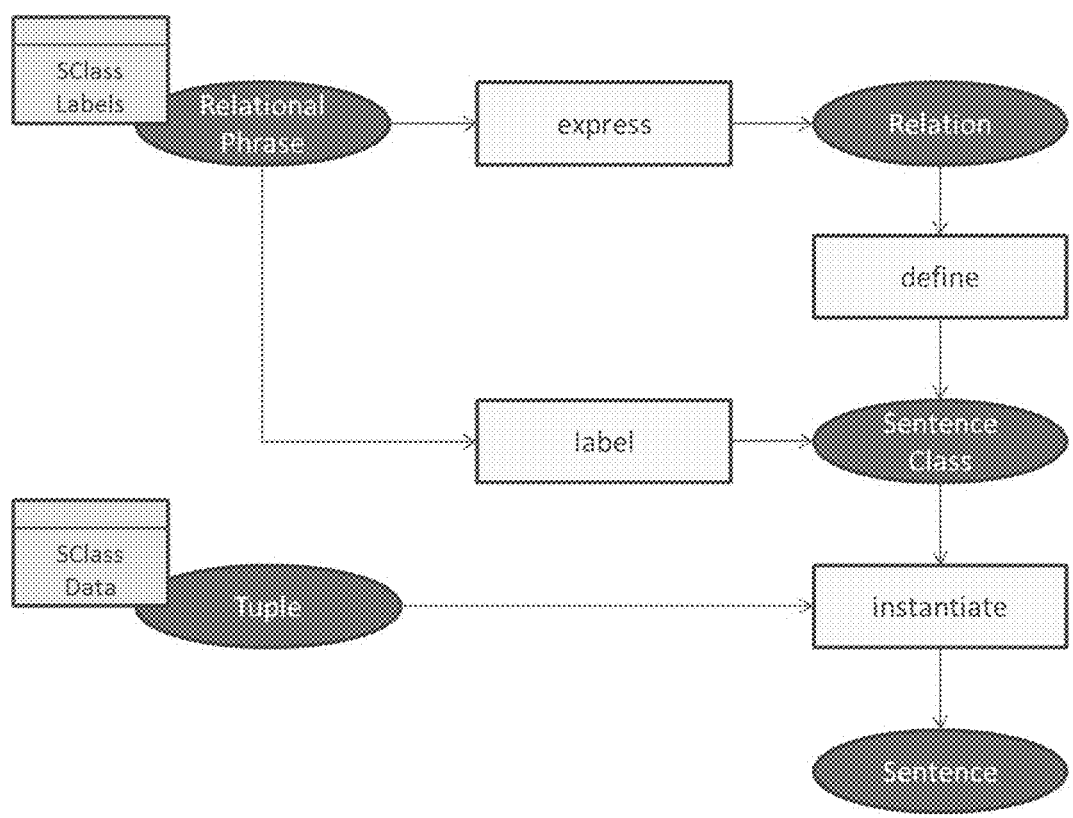
FIG. 1 is a diagram showing key concepts of the SentenceClass model and the relationships among them; in some but not all embodiments, as described herein, RelationalPhrases are kept in a table of SentenceClassLabels, abbreviated here by "SClassLabels", and data records, in the form of tuples, are kept in one or more tables of SentenceClassData, abbreviated here by "SClassData".

The term RelationalPhrase is used herein to mean a phrase, clause, formula or other construct—including, but not limited to SentenceTemplates in declarative or interrogative form, propositional functions, or more generally monadic ("1-ary") and polyadic ("n-ary") predicates, and atoms, literals or clauses in a declarative language such as Datalog or SQL—expressing a relation between objects, represented by free variables capable of being bound, notably by substitution See Wikipedia website, on the page "Free variables and bound variables."

Specific examples include: declarative SentenceTemplates, such as: "Disease X is common in winter"; "Infectious disease X is caused by organism Y"; or "For hematologic disorder X, the expression state of cell surface marker Y is Z", with respectively one, two and three free ("substitution") variables, here denoted X, Y and Z; or related interrogative SentenceTemplates, wherein SentenceClasses so identified also are referred to herein as "QueryClasses"; or formal expressions such as: P(X) wherein the monadic predicate P is applied to a single variable, X, to express a property of any object denoted by X, such an expression also referred to herein as a monadic relation; or $R(X_1, X_2, \ldots, X_n)$ wherein the polyadic ("relational") predicate R is applied to an ordered set of objects denoted by the variables, $X_1, X_2, \ldots, X_n$, to express a (polyadic) relation (see Wikipedia website, on the page "Predicate (mathematical logic)"), such as: "isGeneExpressionPattern $(C,[X]_n)$" where C denotes a clinical condition and $[X]_n$ denotes a set of n (interdependent) Boolean variables indicating the expression state ("high", "low") of n genes of interest that is (or is not) associated with C; Datalog literals or atoms such as: has(P,G) with variable P for patient name or identifier, and variable G for genotype; or receivesTxn(P,D) with variable D for transplant donor; or Datalog clauses formed from atoms or literals.

The term SentenceClass is used herein to mean a class defined by a relation expressed in the form of a RelationalPhrase.

Particular vs Universal SentenceClasses—A SentenceClasses may be a Particular SentenceClass which refers to a particular entity or entity identifier, such as a patient or patient identifier; or a Universal SentenceClass which refers to all entities within a universe of discourse and conveys general domain knowledge, such as medical knowledge.

The term SentenceClassLabel, or simply Label, is used herein to mean an identifier (or name) of a SentenceClass, wherein RelationalPhrases and SentenceTemplates represent such class labels; for convenience, when there is no ambiguity, reference to SentenceClass may be made in lieu of the explicit reference to SentenceClassLabel.

The term SentenceClassData is used herein to mean data intended for instantiating a SentenceClass; also SentenceClassArguments or SentenceClassArgs, for short; preferably stored in a table of SentenceClassData.

The term Sentence is used herein to mean a SentenceClass instance, created by instantiating variables in the RelationalPhrase identifying the class, namely by substituting variables with definite constants or objects. A Sentence may be viewed to express a proposition which has a truth value. See Wikipedia website, on the page "sentence (mathematical logic)".

The term Sentence notably applies to instantiated Data— or KnowledgeStatements, as these terms are used in the parent application Ser. No. 17/072,978 Programmatic Creation of Dynamically Configured, Hierarchically Organized Hyperlinked XML Documents For Presenting Data and Domain Knowledge From Diverse Sources, incorporated herein by reference and hereinafter referred to as "jCode-Disclosure"; a Sentence conveys meaning within the context of a language understood by humans or by machines including parsers, interpreters or other software applications or systems.

I—The Semantic Data Model

Disclosed herein is a relational model of SentenceClasses for representing the semantic content of statements or expressions, and for forming and rendering Sentences.

The model of the invention stores items of information, notably items of data and/or items of knowledge, or references thereto, in accordance with relations between such items, wherein these relations are expressed in the form of RelationalPhrases. As with hypergraphs, but in contrast to RDF and property graphs, which are limited to binary relations, the model accommodates general polyadic relations.

RelationalPhrases such as SentenceTemplates or predicates, or aliases thereof, represent SentenceClassLabels that identify SentenceClasses and reference SentenceClassData for instantiating SentenceClasses, thereby to form Sentences; these RelationalPhrases express attributes of, or relations between the objects substituted for variables of the class, and thereby provide context and "meaning".

Key concepts of the SentenceClass model of the invention, and the relationships among them, are shown in the diagram of FIG. 1.

I.1 Design Principle

As a key element of the semantic data acquisition, storage and presentation system of the invention, the semantic data store provides an intermediate representation of data & knowledge acquired from disparate sources that facilitates the implementation of processes (also "workflows") including but not limited to: data & knowledge acquisition, transformation and integration; production of structured documents, as previously disclosed in jCode Disclosure; and interactive exploration of the semantic data & knowledge store by way of modules with user-facing interfaces. In preferred embodiments of this system, these workflows are defined in terms of jCode directives for execution by the jCode machine previously disclosed.

In contrast to sentential databases, see e.g. Stanford.edu website on the page "Notes/blp," the SentenceClass model does not store (instantiated) Sentences or propositions. In conjunction with rules for forming new SentenceClasses by inference, as described herein, the semantic data model of the invention, in one embodiment, constitutes a deductive database, as shown in the Stanford University website, at the Jarvis/complaw pages, at ddb.html.

I.2 Embodiments

Several embodiments including but not limited to those in the table of FIG. 2 are described herein below. In one embodiment, SentenceClassData tables are views in a SQL database, each view conforming to its defining relation, expressed as a RelationalPhrase referred to as SentenceClassLabel, wherein variables in the RelationalPhrase match column names in the associated view; in another embodiment, all SentenceClassData are stored in a single table in accordance with a generic information model; and in a further embodiment, SentenceClassLabels and SentenceClassData are stored in a deductive database, such as a Datalog database, comprising facts and rules. SentenceClassData comprise items of data or knowledge, or references thereto (such as URIs) for instantiating SentenceClasses by variable substitution.

I.2.1 Sliced Model

In one embodiment, referred to herein as the "sliced" model, a relational database implementing the semantic data model comprises one table of SentenceClassData for each relation defining a SentenceClass, and vice versa, wherein: each SentenceClassDara table is named by the RelationalPhrase expressing the relation that defines the SentenceClass; and tuples in the SentenceClassData table reflect the structure of that relation such that the table comprises columns named by the free variables of the RelationalPhrase, one column for each such variable, as illustrated in the tables of FIGS. 3A to 3C; preferably, columns are arranged in the order of appearance of the variables in the relation.

Variables may represent constants of any data type, as in the table of FIG. 3A, or may represent vectors, as in the table of FIG. 3B which holds multiple column 'X' entries relating to the same SentenceClass, for the conditions "Burkitt's lymphoma" and "Hairy Cell Leukaemia", reflecting the characterization of these conditions by several cell surface markers (in column 'Y'), each with a value (in column 'Z') of "positive" (indicating "expressed") or "negative" (indicating "not expressed"); more generally, variables may represent complex objects such as lists comprising elements of different data type, or other complex objects such as arrays or lists; the instantiation of SentenceClasses with complex objects preferably will be handled in accordance with jCode directives that include formatting or rendering directives executed by the jCode machine, as disclosed in "jCode Disclosure".

Columns in SentenceClassData tables accommodate any data type supported by relational database management systems, including complex data types such as strings, illustrated in FIG. 3C, or other serialized objects such as XML, JSON or FHIR objects or (serialized) RDF triples.

SentenceClassData tables such as those in FIG. 3A and FIG. 3B hold items of domain-specific knowledge such as medical knowledge for instantiating universal SentenceClasses; SentenceClassData tables such as that in FIG. 3C hold items of data such as laboratory test results for instantiating particular SentenceClasses: the latter tables have a column holding unique ("case") identifiers for persons or other entities.

I.2.2 Generalized Sliced Model

More generally, it may be desirable or necessary to place RelationalPhrases into a separate table of SentenceClassLabels. To ensure referential integrity, the constituent entries will referenc SentenceClassData tables, and vice versa, preferably by way of foreign keys. FIG. 4 shows a table of SentenceClassLabels holding RelationalPhrases or SentenceTemplates that identify, and foreign keys referring by name to individual SentenceClasses in the tables of FIG. 3. As with the Sliced Model, the Generalized Sliced Model is readily extensible.

The introduction of a table of SentenceClassLabels permits the use of aliases of RelationalPhrases for naming SentenceClassData tables such as those in the table of FIG. 4.

This model also readily accommodates QueryClasses. In one embodiment, QueryClassLabels are held in the table of SentenceClassLabels; in another embodiment, they are held in a separate table of QueryClassLabels. As with SentenceClasses, QueryClasses will reference a SentenceClassData table.

The key operation of instantiating a SentenceClass, by way of a sequence of SQL queries, is shown in Example E1. The design of the semantic data model simplifies instantiating queries, as each SentenceClassData table represents the data items for instantiating its SentenceClass in a single record, and may be implemented, in one embodiment, in the form of a VIEW: this eliminates from the instantiating (and other) queries JOINS that otherwise may be required for assembling such a record. Operations on SentenceClasses, including that of instantiation, are described in greater detail below.

Further, a RelationalPhrase or SentenceTemplate in the table of SentenceClassLabels may reference one or more SentenceClassData tables; conversely, a SentenceClassData table may reference one or more RelationalPhrases.

Conditional SentenceClass Instantiation—In certain other embodiments, the same RelationalPhrase or SentenceTemplate may apply to different SentenceClassData tables. For example, "The preferred treatment, for a diagnosis X and patient age Y, is Z" would call for the conditional selection of a specific record from the SentenceClassData table.

SentenceClass Qualifiers—In one embodiment, related variants of a SentenceClassLabel may be identified by a single RelationalPhrase with a qualifier to direct the situation-specific dynamic selection of the desired variant; for example, the SentenceClasses "Patient X has|does not have|may have|has recovered from|likely will develop disease Y" may be identified by the single SentenceTemplate "Patient X has disease Y", with the qualifiers "affirmation", "negation", "possibility", "history", "prognosis" in an additional column of the table of SentenceClassLabels indicating specific variants.

Derived Data—Entries in the table of SentenceClassLabels may reference none of the existing tables of SentenceClassData but may anticipate instantiation by data derived from multiple records. Examples include the use of supplemental data in SentenceClassData tables, as in the case of the Bayesian analysis of contingency tables; or case retrieval queries, both described in greater detail in Section II. A further example which combines conditional SentenceClass instantiation and the use of SentenceClass qualifiers with the notion of derived data is that of evaluating a condition comprising two records in a table of antigen phenotype profiles, that table in a format wherein each antigen is represented in a separate column, or preferably in a format analogous to that of the table in FIG. 3B, each record representing a Boolean vector indicating the expression status of a designated set of red blood cell antigens, a first such vector, $[X_R]$, for the intended recipient, and a second, $[X_D]$, for a candidate donor, and the condition in the form of a Boolean expression ALL $(([[X_R]\char`\^[X_D]])=ALL([X_R]v[[X_D]]))$, where ALL is a function that returns TRUE if all elements of the its vector argument are TRUE and FALSE otherwise—then, the SentenceTemplate "Donor D is compatible|not compatible with recipient R" would be conditionally instantiated wherein the qualifier ("assertion" or "negation") reflects the evaluation of the Boolean expression.

Dynamic Template Selection—In certain embodiments, a RelationalPhrase or SentenceTemplate may be selected at run-time from several Templates referencing the same SentenceClassData table, the selection depending, for example, on the intended audience of the instantiated Sentence who may have differing levels of expertise in the subject matter or speak different languages.

In other embodiments, a RelationalPhrase or SentenceTemplate may be formed, at run time, from building blocks stored in a separate table within the database. More generally, in yet another embodiment, Templates or building blocks thereof are not stored, but are created or formed at run time by a web service or other application: this functionality would provide the flexibility to create Templates in response to changing situations or conditions.

Entity-Attribute-Value ("E-A-V") Format—To accommodate entities with different numbers of attributes of the same or different type, individual SentenceClassData preferably conform to an Entity-Attribute-Value ("E-A-V") or Entity-Attribute-Value-TimeIndex ("E-A-V-T") format, as in the table of FIG. 5A. More generally, attributes may be of different data type. When recording events or transactions, SentenceClassData tables in this format may be augmented by a column holding event or transaction times, or references thereto, to mark, for example: the date of completion of a clinical lab test, as in the tables of FIG. 5A; 5B; or the insertion or deletion of entities; or, for an existing entity, the insertion or deletion of attributes, or updates thereto, as in the tables of FIG. 6.

As illustrated in the table of FIG. 5B, these tables preferably may reference an 'AttributeDefinitions' table comprising: descriptions of attributes; data type definitions, domain specifications, reference ranges for diagnostic tests; enumerated vocabularies, and other information of interest. More generally, entries in other columns of the SentenceClassData table also may reference other tables, for example an 'EntityDefinitions' table holding patient detail, as in the ncbi.nim.nih.gov website, at the page pmc/articles/PMC2110957/pdf/nihms33976.pdf.

Supplemental Content in SentenceClassData Tables—In addition to data items for instantiation of the referenced SentenceClass, a SentenceClassData table also may contain supplemental material; examples include:

Connectors or other identifiers, including Universal Resource Identifiers ("URIs") pointing to sources of data or knowledge; resources stored at the identified locations may be accessed in real-time to instantiate the corresponding variable in a SentenceClass. In a preferred embodiment, such operations are performed under the control of the jCode machine, disclosed in jCode Disclosure, and further elaborated herein below.

Clinical epidemiological data, such as the observed counts for specific conditions: these will be updated periodically by queries to separate data tables or other data sources (not shown here); the inclusion of such data in the SentenceClassData tables facilitates the integration of downstream analysis with SentenceClass instantiation. This is further described in connection with the Bayesian analysis determine measurement uncertainty.

I.2.3 Generic Information Model

The SentenceClass model also may be represented in a "generic" form that is advantageous if the number of individual SentenceClassData tables is large, or when tables may be added or deleted, or when table structure may change. In this model, all SentenceClassData are held in a single table, as illustrated in FIG. 7, which remains unaffected by any changes to the individual SentenceClassData tables in the "sliced" model described herein above. SentenceClasses preferably may be organized in a hierarchical classification, H-1, H-2, H-3, . . . , as illustrated in FIG. 8. FIG. 9 shows a schematic information model.

In one embodiment of this model, to access and instantiate a specific SentenceClass, a temporary table for that class will be created and populated and SQL queries directed to this temporary table. To that end, the table of SentenceClassLabels, for each referenced class, comprises a 'SQL-Create' column with the SQL code to create such a temporary table, and a 'SQL-Insert' column with the SQL code to insert records into the temporary table with the data extracted from the SentenceClassData. In one embodiment, such a temporary table will be a "pivot" table restoring the "wide" format of a SentenceClassData table for a selected SentenceClass-Label, that is, recovering, from the table in FIG. 8 one or more "slices", in the form of the tables in FIGS. 3A to 3C; in one embodiment, this may be implemented by way of VIEWs.

The model may comprise additional tables, for example a table holding definitions of the items in the SentenceClass-Data table, serving the analogous function of the 'AttributeDefinitions' table of FIG. 5B for the E-A-V model.

I.2.4 Deductive Database Model

SentenceClassData along with SentenceClassLabels, including SentenceTemplate or predicate formulas, may be stored as tuples ("facts") in a deductive database comprising a collection of assertions including "facts" and "rules", wherein facts preferably are stated as "Entity-Attribute Value" triples—as illustrated in FIG. 10—or "Entity-Attribute-Value-TimeIndex" quadruples, and wherein rules may embody conditions on queries or state rules of inferences by which to combine existing SentenceClasses into new SentenceClass. While the "fact" and "rule" entries in the database of FIG. 10 all contain the same predicate, and conform to the same E-A-V format, this is not a limitation: instead, the elements of triples may be permuted and may reference elements of other entries.

In a preferred embodiment, the deductive database conforms to a declarative programming language such as Datalog (see e.g. the website for download.racket-lang.org, at the page releases/8.2/pdf-doc/datalog or CLINGO at the website page utexas.edu, page vI/teaching/378/pwc queries directed to the deductive database in FIG. 10 are illustrated in Example E2. In a preferred embodiment, queries will be instantiated, and their results processed—for example to extract a RelationalPhrase or to extract data—in accordance with jCode directives.

By design, a deductive database offers the further benefit of integrating the instantiation and execution of queries with programmatic reasoning, notably deductive or abductive inferences, as elaborated herein.

I.2.5 Other Embodiments

While the present disclosure focuses on the implementation of the SentenceClass model in a relational database, it will be understood that other implementations are available, notable among these graphical representations including conceptual graphs (Sowa1984, op.cit.), entity-relationship diagrams (see Chen1976 at the website csc.lsu.edu), hypergraphs or, for binary relations, databases representing (serialized) RDF and property graphs, wherein SentenceClassLabels would be specified in an ontology (see Gruber1992 at web.archive.org/web/20100716004426/http://www-ksl-.stanford.edu/kst/what-is-an-ontology.html) and a particular graph would be instantiated by populating the ontology with selected data or knowledge items stored in such a graph database as tuples representing the SentenceClassData table. For example, in an RDF triple store, data records for instantiating the SentenceClass "Hematologic disorder X is characterized by cell surface marker Y with value of Z" (FIG. 3B) may be represented by triples of the form "Burkitt lymphoma: expressed: CD10" and "Burkitt lymphoma: not expressed: CD10"

II—Operations on SentenceClasses ("Methods") With Applications

SentenceClasses are manipulated by basic and special operations, as described below, these operations invoking SQL queries or Datalog queries, as elaborated below, or preferably invoking the jCode machine in accordance with jCode directives, and this preferably may include instantiating QueryClasses.

II.1 Basic Operations on SentenceClasses

Methods for manipulating SentenceClasses include the four basic operations of Create, Read, Update and Delete, as follows, where "SQL" refers to the Sliced or Generalized Sliced Model, and mutatis mutandis to the General Information Model, while "Datalog" refers to the deductive database; re Datalog syntax, see e.g. at the website docs.racket-lang.org pages: datalog/datalog.html. In one embodiment, SQL queries referencing tables comprising complex data types may be in the form of recursive queries, to parse strings such as those in column 'Y' of the table in FIG. 3C; in other embodiments, parsing and other data transformations may be executed "in-code", preferably in accordance with jCode directives.

II.1.1 CreateClass (aka AddClass)

SQL: obtain or create new RelationalPhrase; CREATE SentenceClassData table with a structure conforming to the RelationalPhrase, that is: with columns named after variables in said RelationalPhrase; use RelationalPhrase, or assign alias to name this table; in Generalized Sliced Model, INSERT RelationalPhrase into table of SentenceClassLabels; for the general information model, unless initializing a new database, CREATE SentenceClassData table is replaced by an INSERT SentenceClassData into existing table of SentenceClassData Datalog: obtain or create new RelationalPhrase and corresponding predicate formula and insert triples into database, along with data records, in accordance with the following example (see also FIG. 10):
eav(1_0,label/relPhrase, "Pathogen x causes Disease y").
eav(1_0,label/predicate, "causes(X,Y)").
eav(1_1,x,malaria).
eav(1_1,y,plasmodium_falciparum).
eav(1_1,x/Transmission,vector/mosquito).

II.1.2 Read Class

SQL: read a designated entry in table of SentenceClassLabels and/or a corresponding entry in an associated table of SentenceClassData, in accordance with the corresponding queries in the first portion of the instantiating query in Example E1.

Datalog: proceed in accordance with the queries in Example E2.

These queries may be programmatically instantiated and conditioned, preferably in accordance with a jCode directive by substituting specific values for any one or any two of the variables in a query template of the form R(X,Y,Z)?", where R denotes the desired predicate, and X, Y and Z denote variables. An unconditioned query, such as "eav(X,Y,Z)?" for the database in FIG. 10, will return all entries in the database with predicate "eav", and analogously for "eav_xy" and "eav_defs".

In one embodiment, a query interface comprises a dictionary wherein specific queries are paired with simple textual commands such as those in the comment lines in Example E2, indicated by "%"; more generally, a preferred embodiment comprises a user interface with (in this case) four text entry fields, wherein the interface software prompts for the selection of entries from drop-down lists displaying domain-specific vocabularies, and instantiates R and one or more of X, Y and Z and then invokes jCode directives for instantiating the query.

II.1.3 UpdateClass, by Inserting New Record Into SentenceClassData Table

SQL: as indicated, modify designated RelationalPhrase in table of SentenceClassLabels or replace with updated version; and/or UPDATE designated record(s) in associated SentenceClassData table Datalog: as indicated, modify designated RelationalPhrase in database or replace with updated version and/or proceed likewise with SentenceClassData records

II.1.4 DeleteClass (aka RemoveClass)

SQL: delete designated table of SentenceClassData, or, in the General Information Model, delete the designated records, and, delete the associated RelationalPhrase from the table of SentenceClassLabels (if existing)

Datalog: "retract" all records for the designated SentenceClass from the database

II.2 Special Operations on SentenceClasses ("Methods")

Special operations include, but are not limited to those described below. In one embodiment, special operations may be performed by SQL queries; in a preferred embodiment, special operations are executed in accordance with jCode directives.

II.2.1 InstantiateClass—This is the quintessential method of the model, namely to substitute variables in RelationalPhrase with selected data by executing an "instantiating query".

SQL: preferably using CommonTableExpressions, proceed as shown in Example E1: given a SentenceClass id, SELECT RelationalPhrase from table of SentenceClassLabels, SELECT data record from associated SentenceClassData table, replace variables in the former by data in the latter; Example E3 shows a jCode directive invoking and instantiating parametrized SQL queries to perform instantiate a SentenceClass Datalog: form and execute queries to retrieve RelationalPhrase and SentenceClassData for the designated SentenceClass; extract RelationalPhrase from the first returned triple, and data from the additional returned triples, and perform variable substitution, preferably by invoking jCode Variable substitution, preferably by way of jCode directives, is not limited to constants but also accommodates vectors, arrays, lists or other objects.

II.2.2 transformClassLabel—translate RelationalPhrase, for example from a SentenceTemplate to a predicate formula, as in "Patient X has disease D" to "has(X,D)" or vice versa or to a form comprising qualifiers, or to another representation such as a 'Controlled Natural Language', or from a first (source) language to a second (target) language.

II.2.3 createSubClass—Subclasses of existing SentenceClasses may be created in several ways, including, but not limited to the following.

II.2.3.1 createSubClass.modify—select or form a modified RelationalPhrase in accordance with Qualifiers such as "Assertion", "Negation" and others, as disclosed herein;

II.2.3.2 createSubClass.extend—extend a Relational-Phrase to introduce one or more new variables accommodate and report data in supplemental columns of a SentenceClass-Data table or data derived therefrom, or data derived or obtained from other sources; an example of this case is that of the Bayesian analysis of a 2×2 contingency table, to determine measurement uncertainty, as described below.

Bayesian Analysis of 2×2 Contingency Tables—The supplemental data in the table of FIG. 11A represent the elements of a 2×2 contingency table, shown in FIG. 11B; Example E4 describes the use of these supplemental data to determine the experimental uncertainty of reported clinical data by Bayesian analysis. See mas.ncl.ac.uk website at the page nma9/Bayes2 x2. In one embodiment, these and other "derived data", such as the total count, n, the goodness-of-fit measure $X^2$, or likelihood ratio preferably are computed in real-time, for example by invoking queries deployed as functions or stored procedures or invoked via web services.

An extended SentenceClassData table supports the instantiation of an extended SentenceClass. For example, in the case of the table in FIG. 11A, for the universal SentenceClass "Hematologic condition X with expressed cell surface marker Y", a particular subclass, applied to patient A, say, may be provided to accommodate data derived from the additional entries in that table, for example: "Patient A has hematologic condition X with expression status E for cell surface marker Y, with positive predictive value V", where V=a/(a+b), or any other function f=f(a,b,c,d) of interest, may be evaluated in real time. In one embodiment, as with SentenceClass Qualifiers, the table of SentenceClass will comprise a qualifier to indicate the use of an extended RelationalPhrase or SentenceTemplate to accommodate the derived data.

In one embodiment, the instantiation will be performed by nested substitution, preferably by invoking the jCode machine, that is: first replace "V" by the vector (a,b,c,d), the elements extracted from the extended table of FIG. 11A; then use that vector as an argument to a function returning the value V, e.g. V<-getPPV (create Vector(a,b,c,d)).

II.2.4 createNewClass—SentenceClassData tables may be queried so as to instantiate new SentenceClasses, wherein Templates identifying such new classes are provided in, or referenced by the query or otherwise explicitly prescribed, for example as "prescribed" RelationalPhrases in the table of SentenceClassLabels.

II.2.4.1 createNewClass.prescribe: Case Retrieval—A SentenceClassData table may serve as a "case base", and querying such a case base calls for a new SentenceClass that is to be instantiated by the query output.

A typical case retrieval query may be for cases matching or partially or approximately matching a given test case, to retrieve, for example, all cases with a diagnostic test Y with value Z, or with value Z in the range [Z−ΔZ, Z+ΔZ], for specified ΔZ. In one embodiment, such a query will contain a Template identifying a new SentenceClass, such as "The case base contains the following [C] cases matching patient X for diagnostic test Y", where X represents the test case and [C] represents an array of case identifiers retrieved by the query.

In one embodiment, case retrieval queries are expressed in SQL, and if directed to SentenceClassData tables in E-A-V or E-A-V-T format, may invoke temporary tables, as described in connection with the Generic Information Model. In a preferred embodiment, such queries will be executed, and the instantiation performed, in accordance with jCode directives that also provide the RelationalPhrase or SentenceTemplate identifying the new SentenceClass.

II.2.4.2 createNewClass.prescribe: Inference—New SentenceClasses may be formed from existing SentenceClasses in accordance with the rules of inference, notably by deductive or abductive reasoning.

Deductive & Abductive Reasoning—The table of FIG. 12A shows examples of deductive and abductive inference typically encountered in the clinical context: the protasis (or antecedent) comprises particular ("P") and universal ("U") SentenceClasses, while the apodosis (or consequent) comprises one or more particular SentenceClasses, but no universal SentenceClass. Particular SentenceClasses, when instantiated, express observations about individual patients (or individuals or entities) while universal SentenceClasses express medical (or other domain) knowledge that applies to all patients (or individuals or entities in the domain under consideration). Universal SentenceClasses, such as those in the tables of FIG. 12, will be instantiated by reference to a corresponding SentenceClassData table—for example, the universal SentenceClass, in the first entry in the table of FIG. 12A, namely "Pathogenic organism Y responds to treatment T", would reference a table pairing specific pathogens with recommended antibiotic or other treatments.

Clinical Decision-Making—Inference statements within the SentenceClass model inform clinical decisions, illustrated in the table of FIG. 12B by a sequence of inferences guiding the management of patient X. Because of the positive test C, the initial inference implies disease D; however, lack of response to treatment T then rules out D, indicating that test C must have given a false positive result.

A specific method of clinical decision making that proceeds by abductive inference is differential diagnosis. As illustrated in the table of FIG. 6C, abductive reasoning initially yields an apodosis providing two or more plausible explanations for the observations stated in the protasis; the ambiguity is resolved by new facts produced by subsequent steps, leading, by deductive reasoning, to an unambiguous result.

In clinical and other applications, additional patterns of inference, for example those affirming class inclusion, wherein SentenceClasses in protasis as well as apodosis are universal SentenceClasses, also will be observed.

Instantiating New SentenceClasses—In one embodiment, to instantiate a new SentenceClass in the apodosis, a SQL query will be executed on the SentenceClassData table(s) referenced by the SentenceClasses in the protasis, wherein the query also provides the RelationalPhrase identifying the new SentenceClass; in other cases, a "prescribed" RelationalPhrase may be provided in the table of SentenceClassLabels.

The SentenceClass in the apodosis may be instantiated by a SQL statement that executes a JOIN on columns of the same name in SentenceClassData tables referenced by the SentenceClasses in the protasis. For example, given two SentenceClasses in protasis, the first identified by the Template "Patient X shows clinical features C" and referencing a SentenceClassData table T1, with columns named 'X' and 'C', and the second identified by the Template "Clinical feature C is found in disease D with a 2×2 contingency table T", with columns named C, D plus supplemental columns named a, b, c, d (see also FIG. 12), then the SentenceClassData table T3, referenced by the SentenceClass in apodosis, identified by the Template "Patient X has disease D with a predictive value V" may be instantiated by a SQL JOIN, namely: taking a first column from the first table in protasis (T3.X=T1.X), and a second column from the second table (T3.D=T2.D), and a third column, named V, which holds the positive predictive value, computed as described in connection with FIG. 12.

In a preferred embodiment, such queries will be executed, and the instantiation performed, in accordance with jCode directives that also provide or reference the Template identifying the new SentenceClass.

In another embodiment, the inference creating the new SentenceClass may be compactly expressed in the form of a logic program that also introduces, in the head of a rule, the RelationalPhrase identifying the new SentenceClass. This is illustrated in Example E5 by Datalog programs for several of the cases in the tables of FIG. 12.

II.2.4.3 createNewClass.infer—In certain cases, the RelationalPhrase identifying a new SentenceClass formed in accordance with the rules of inference may itself be inferred, notably when the inference conforms to transitive closure (reflecting the nature of the underlying syllogism), namely: $P(X,Y)\hat{} U(Y,Z) \rightarrow P'(X,Z)$, where P and $P' \neq P$ each express a particular, and U expresses a universal binary relation. This is a general version of transitive closure for binary relations, e.g. $R(X,Y)$=isTaller$(X,Y)$="X is taller than Y", namely $R(X,Y)\hat{} R(Y,Z) \rightarrow R(X,Z)$.

As illustrated in Example E6 for several of the cases in the tables of FIG. 12, deductive and abductive inferences in the clinical setting indeed often conform to generalized transitive closure. More generally, transitive closure also may be of the form $R(X,Y)\hat{} S(Y,Z) \rightarrow T(X,Z)$ where R, S and T each may represent universal or particular relations (in combinations reflecting the underlying syllogism).

In generalized transitive closure, the SentenceTemplate identifying the inferred SentenceClass inherits its subject, say "patient X", from the particular SentenceClass, and its object, say "treatment T", from the universal SentenceClass in the protasis, wherein, in a standard form of these Templates, each free variable immediately follows the type label ("Patient", "Disease", "Treatment", "Condition", etc) to which the variable refers ("Patient X", "Disease D", "Treatment T", "Condition Y", etc); the variable, once instantiated, attaches a name and thereby designates an individual of that type.

This formation rule produces a statement such as "Patient X*treatment T", where "*" represents a wild-card character. To complete the SentenceTemplate, the wildcard is expanded into a (transitive) verb, or a verb phrase, for example a verb phrase comprising a Qualifier (as described herein above). In special cases, as illustrated in Example E6.1, the Template inherits the verb from the particular SentenceClass in the protasis. In other embodiments, the wildcard is expanded with reference to one of: human assistance, preferably with reference to a domain-specific table of suitable verbs given subject and object of the Template or a controlled natural language; or a table generated by a learning algorithm that scans English sentences in domain-specific references for common usage patterns.

II.4 Special Operations on SentenceClasses Defined by Dyadic (Binary) Relations

II.4.1 For binary relations, a SentenceClassData table, or a deductive database, or may be viewed as a representation of an RDF (or equivalent) graph, with edge labels given by the RelationalPhrase in the table of SentenceClassLabels, or in the deductive database, motivating the definition of methods including but not limited to the following, preferably implemented by way of jCode directives.

II.4.1.1 createAdjacencyList—scan first column, say 'X', of SentenceClassData table (or designated subset thereof) and for each unique entry ("node"), list paired entries in second column, say 'Y'.

II.4.1.2 createAdjacencyMatrix—initialize to 0 a square matrix of dimension dim=c(n,n), where n denotes the number of unique entries in a SentenceClassData table (or a designated subset thereof); for every entry in adjacency list, set corresponding matrix element to 1.

II.4.1.3 createReachabilityMatrix—perform a depth-first-search graph traversal, as in Example E7 (for path enumeration); or, given the adjacency matrix, (recursively) compute the matrix $R=A+A^2+ \ldots +A^n$, where n denotes the number of unique entries in a SentenceClassData table (or designated subset thereof); this also is known as the transitive closure of the graph.

II.4.1.4 inferRelation—if a designated entry V in the column 'Y' is reachable from a designated entry $U \neq V$ in column 'X', then automatically infer the relation $P(U,V)$, implying an additional edge in a graph representation.

II.4.1 5 renderLabeledGraph—create nodes reflecting entries in the SentenceClassData table(s) or database of interest (or a designated subset thereof); draw (directed) edges for all pairings in adjacency list; label with RelationalPhrase in table of SentenceClassLabels; in a preferred embodiment, jCode would product output in a "triple-store" format using JSON or TURTLE, and invoke one of several available libraries, or a program such as webVOWL (as shown on the visualdataweb.org website) to generate the graph; in one such case, a library function would receive a list of unique pairs from the SentenceClassData table along with an optional parameter to select the graph layout.

II.4.2 Homogeneous Dyadic (Binary) Relations, such as isAncestor$(X,Y)$, are of special interest in many applications (genealogies, social networks, etc), and these may have special properties, notably: Reflexivity, Symmetry and Transitivity, motivating further methods including, but not limited to the following, preferably implemented by way of jCode directives.

II.4.2.1 isSymmetric—to test for symmetry of the relation defining the class, check that for every pair (X,Y) in the SentenceClassData table (or a designated subset thereof), there is a pair (Y,X); or, given the adjacency matrix (below), check for symmetry of that matrix;

II.4.2.2 isTransitive—to test for transitivity of the relation defining the class, that is: to establish whether a designated entry Z in column 'Y' is reachable from a designated entry X in column 'X' with one intermediate step, look for "chaining" of pairs such as (X,Y) and (Y,Z) in the SentenceClassData table; or, given the adjacency matrix, A, compute $A^2=A \times A$ and check whether A has non-zero elements for all non-zero elements of $A^2$;

II.4.2.3 isReachable—to test whether a designated entry V in the column 'Y' is reachable from a designated entry $U \neq V$ in column 'X', traverse the SentenceClassData table (by "chaining" pairs, which is equivalent to graph traversal by depth-first search); or, given the reachability matrix (below), examine the corresponding elements of that matrix.

III. SentenceClass Ontology

Figure 13:
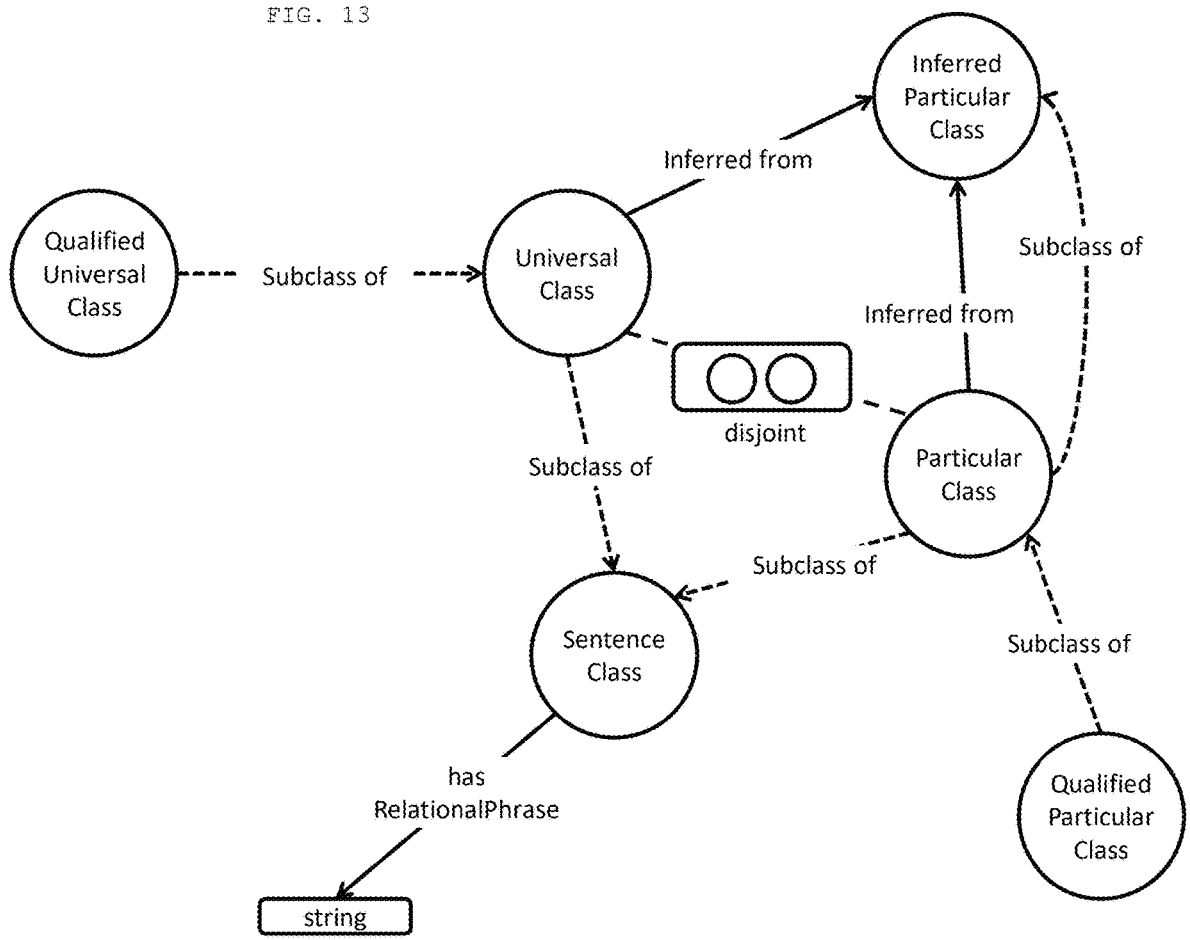
FIG. 13 shows an ontology of SentenceClasses displaying class relationships and attributes (created using webVOWL as shown on the visualdataweb.org website.; "Qualified P" and "Qualified U" respectively denote Qualified Particular and Universal Class; the attribute "has RelationalPh . . . " denotes "has RelationalPhrase"; see text for detail.

In a preferred embodiment, the SentenceClass model also may comprise an ontology that specifies relations between domain-specific SentenceClasses reflecting, for example, the following types of class relations:

Particular and universal SentenceClasses (as elaborated below) are disjoint;

New SentenceClasses formed from particular and universal SentenceClasses by deductive or abductive inference (as elaborated herein) may conform to a generalized transitive closure relation;

Qualifiers modify a generic relation so as to define subclasses of the parent SentenceClass An ontology may be represented by a graph such as that in FIG. 13; in special cases, an ontology (or subset thereof) may have a hierarchical structure and then may be incorporated in the hierarchical organization of SentenceClasses anticipated in the table of FIG. 7.

Domains & Vocabularies—The complete SentenceClass model specification preferably also includes one or more tables enumerating vocabularies for the domain of the propositional functions defining SentenceClasses; for example, for the table of FIG. 3A, the domain for the variable X (in column 'X') will be defined in terms of a vocabulary of pathogens, and the domain for the variable Y (in column 'Y') will be defined in terms of a vocabulary of infectious diseases; optionally, a domain taxonomy or ontology also may be provided.

IV Semantic Data Acquisition, Storage and Presentation

A SentenceTemplate identifying a SentenceClass, as described herein, is equivalent to "framing text", described in the jCode Disclosure, wherein the jCode machine instantiates variables in framing text by multi-level substitution to create instantiated Data- or KnowledgeStatements which therefore represent SentenceClass instances, as defined herein. Accordingly, the jCode machine is the natural complement to the SentenceClass model.

IV.1 Integrating the Semantic Data Store Into jCode Workflows

Specifically, the jCode machine, in conjunction with the SentenceClass model of the present invention, provides a system for:

acquiring and transforming the constituent data or knowledge items intended for instantiating SentenceClasses;

storing said items in conjunction with the designated RelationalPhrase or SentenceTemplate in a semantic database of the present invention; querying this semantic database; and producing instantiated Data—and KnowledgeStatements, preferably including smart formatting and HTML rendering as previously disclosed in jCodeDisclosure.

Accessing Data Sources—As previously disclosed, jCode directives coordinate the acquisition of data and knowledge items from disparate data sources, including relational and non-relational databases, csv files and web resources as well as hierarchically structured documents. Specifically, the jCode machine orchestrates database access, query execution and data retrieval by a generic process comprising these steps:

retrieve a query string embedded in jCode or referenced by jCode;

open a connection to a database system or data store specified or referenced in jCode, using a database system-specific client-side library and database instance URL as well as connection credentials;

send the query string to the database system and instruct the database system to execute the query;

create an in-memory object to hold the table produced by the query execution and returned by the database manager.

Populating the Semantic Database—Preferably, the jCode machine populates the SentenceClassData table(s) concurrently with instantiating a Data—or KnowledgeStatement (which may itself be performed in the course of assembling an XML document), as disclosed in "jCode Disclosure". That is: the operational sequence executed by the jCode machine for forming an instantiated Data—or KnowledgeStatement is modified by the step(s) of storing the constituents in the semantic database (indicated below in boldface):

acquire framing text, preferably from the Table of SentenceClasses or, if not existing, acquire framing text from an alternative source (such as the reportConfiguration schema of the "jCode Disclosure") and store this in a table of SentenceClassLabels;

acquire and transform data and/or knowledge items intended for instantiation of the framing text and (if not already present), store these items in the SentenceClassData table associated with the framing text.

Assembling Data—and/or KnowledgeStatements—Having executed the sequence of steps above, including where necessary, the sourcing of framing text and creation of new tables, and having populated the semantic database, the jCode machine may proceed, either immediately or at a later time of choice, to instantiate and render Data—or KnowledgeStatements by:

performing requisite transformations (casting) of complex data including such calculations as max/min/avg and others;

forming an instantiated Data—and/or KnowledgeStatement (preferably in XML), by completing variable substitutions;

rendering instantiated statement(s) for HTML display (preferably with reference to HTML 5 rendering instructions for inclusion in both XML and HTML output).

In the latter scenario, Data—and/or KnowledgeStatements are re-constituted, at a later time of choice, by retrieving the constituents from the semantic database and executing jCode directives to instantiate SentenceClasses. Data acquisition, rather than requiring access to potentially diverse original data sources, now will proceed by accessing tables in the semantic database, which is particular beneficial when the original sources are no longer accessible, and in fact facilitates SentenceClass instantiation as the structure of the SentenceClassData tables reflects the structure of the relation expressed by the associated RelationalPhrase. Thus, the semantic database provides an integrated data and knowledge source, optionally hosted on premises or in the "cloud". In a preferred embodiment, the processes for populating Semantic Database and those for assembling Data—and/or KnowledgeStatements may operate independently and asynchronously.

Preferably, SQL (or other) queries referencing the table of SentenceClassLabels and individual SentenceClassData tables are executed in accordance with jCode directives. Mutatis mutandis, these will accommodate SQL as well as other query languages such as Datalog or SPARQL and other graph query languages. See Wikipedia website, on the page "Graph Query Language." To that end, the data abstraction layer, which manages the second step in the generic process for database access, query execution and data retrieval, described above, is extended so as to reference a library for the new database and new query helper functions to simplify accessing that new database. Example E3 describes SQL queries for populating a SentenceClassData table and for instantiating a SentenceClass by invoking jCode machine.

IV.2 jCode Workflows for Specific Applications of Interest

Preferably, to implement sequences of operations for acquiring, transforming, recording analyzing and reasoning about data and related knowledge items, jCode "pipelines" are created for execution by the jCode machine. Example include, but are not limited to: performing the Bayesian analysis of the 2×2 contingency table of FIG. 11A, or coordinating the abstraction of content from a FHIR resource and its importation into the SentenceClass database, or creating "composite" documents, as elaborated in Examples.

IV.2.1 Handling FHIR Resources—Further, the jCode machine also facilitates the programmatic abstraction of specific content from FHIR resources for storage in a SentenceClassData table by executing a sequence of "importing—transforming—recording" steps, as illustrated in Example E7, with reference to FIG. 14.

FHIR resources, or relevant sections thereof, also may be reconstituted from the semantic database of the invention, and this facilitates the electronic transmission from a first to a second SentenceClass database: preferably, in such a scenario, the relevant "framing text" (or a reference thereto) may be included by the sender, for example as a <text: value> entry, in the FHIR resource reconstituted from a first semantic relational database, and extracted by the receiver who abstracts the transmitted resource for storage in the Table of SentenceClassLabels in a second semantic database..

IV.2.2 Handling RDF Resources—This generic process also will accommodate input provided in the form of graphs by invoking queries in a graph query language, notably for RDF (see w3.org website, under "Resource Description Framework") or property graphs.

In one embodiment, RDF triples are represented in an E-A-V data model, which can be queried using SQL, preferably by creating temporary tables, as described herein in connection with the generic form of the SentenceClass model, or by using a query language such as Datalog. In another embodiment, path enumeration of trees, such as that in Example E7, may be modified by standard methods (namely to invoke back-tracking) to extend path enumeration to RDF graphs that are not trees but more generally directed acyclic graphs. In a further embodiment, the abstraction layer of the jCode machine may be modified in accordance with dotNetRDF.org website, on the pages stable/user guide to connect to RDF stores using SPARQL SELECT queries see the page Querying-with-SPARQL; tabular output from these queries is transformed, in a manner analogous to that of Example E7, to conform to the structure of a SentenceClassData table.

IV.2.3 (Re-)Assembly of Structured Documents—Access to the semantic database also facilitates the assembly of instantiated Data- or KnowledgeStatements into new hierarchically structured documents by invoking the jCode machine and DocAssembler, with access to a report configuration schema, as previously disclosed in "jCode Disclosure".

Of special interest is the assembly of documents such as the "comprehensive clinical reports" required under CLIA/CAP regulations (see cap.org website, "protocols and guidelines/cancer-reporting-tools") by programmatically combining information from multiple FHIR resource (or other inputs), including, but not limited to: different types of tests performed on the same day ("test panel"), as illustrated in Example E8 with reference to FIG. 15; the same type of test performed on the same patient on successive dates ("time series"); or the same type of tests performed for different patients ("population analysis").

EXAMPLES

E1 Queries for Writing to and Reading From SentenceClass Database

E1.1 Writing to SentenceClassData Table—to insert, into an existing SentenceClass for "Hematologic Disorders" (FIG. 3B), an additional entry for "Burkitt Lymphoma", say "CD19: positive", execute the requisite INSERT query, for example, referring to the table in FIG. 3B by 'HematologicDisorders':

INSERT INTO HematologicDisorders(X,Y,Z,FK) VALUES ('Burkitt lymphoma','CD19','Positive',2)

More generally, sub-queries may be executed to extract the name of an existing SentenceClassData table from the table of SentenceClassLabels, and to determine its column names (from the meta-data). For a new SentenceClassData table, execute the appropriate CREATE TABLE query, and make a corresponding new entry in the table of SentenceClassLabels.

E1.2 Instantiating a SentenceClass—The following SQLite query illustrates the steps of instantiating the sentence class for the hematologic disorder "CLL" in the 'HematologicDisorders' table of FIG. 3B with reference to the table of SentenceClassLabels in FIG. 3.

using Common Table Expressions:
select from table 'SentenceClassLabels' the record for foreign key ("FK") 'HematologicDisorders' and assign to 'sct'
WITH sct AS (SELECT SentenceClassTemplate AS Template,FK_SentenceClass FROM SentenceClassLabels WHERE FK='HematologicDisorders'),
select from the SentenceClassData table 'HematologicDisorders' the record(s) with FK of the selected SentenceClass class, and with X equal to 'CLL', and assign to 'scd'
scd AS (SELECT*FROM HematologicDisorders WHERE FK=(SELECT FK_SentenceClass FROM sct) AND X='CLL'),
perform substitutions, one at a time (for clarity)
rx AS (SELECT REPLACE((SELECT Template FROM sct),'X',(SELECT X FROM scd)) AS Template),
ry AS (SELECT REPLACE((SELECT Template FROM rx),'Y',(SELECT Y FROM scd)) AS Template),
rz AS (SELECT REPLACE((SELECT Template FROM ry),'Z',(SELECT Z FROM scd)) AS Sentence)
SELECT*FROM rz
result
Sentence
Hematologic disorder CLL is characterized by cell surface marker CD5 with value Positive E2 Querying the Datalog Database—Examples of queries directed to the database in FIG. 10 (with the symbol "%" indicating comments) include:
% extract the RelationalPhrases for all SentenceClass
eav(X,label/relPhrase,Z)?
eav(1_0, label/relPhrase, "Pathogen x causes Disease y").
eav(2_0, label/relPhrase, "Hematologic Disorder x has Marker Y with Expression Status Z").

eav(3_0, label/relPhrase, "Donor X has RBC Antigen Phenotype Y").
% extract SentenceClass Id for a pre-specified Relational Phrase
eav(X,Y, "Pathogen x causes Disease y")?
eav(1_0, label/relPhrase, "Pathogen x causes Disease y").
% extract predicate for the SentenceClass "1"
eav(1_0,label/predicate,Z)?
eav(1_0, label/predicate, "causes (X,Y)").
% extract RelationalPhrase for SentenceClass "1"
eav(1_0,label/relPhrase,Z)?
eav(1_0, label/relPhrase, "Pathogen x causes Disease y").
% extract attribute: value pairs for SentenceClass "3"
eav(3_1,Y,Z)?
eav(3_1, x, _MA2106-6).
eav(3_1, y, "MNS: M+N+S−s+U+|RH: C−E−c(p)+e(p)+V−hrS+VS+hrB−|KEL: K−k+Kpb+Jsb+").
eav(3_1, x/Gender, female).
eav(3_1, x/Ethnicity, black).
eav(3_1, y/Special, "VS+hrB−").
% extract SentenceClassData for SentenceClass "3"
eav_xy(3_1,Y,Z)?
eav_xy(3_1, x, _MA2106-6).
eav_xy(3_1, y, "MNS: M+N+S−s+U+|RH: C−E−c(p)+e(p)+V−hrS+VS+hrB−|KEL: K−k+Kpb+Jsb+").
% extract all supplemental entries for SentenceClass "3"
eav_defs(3_1,Y,Z)?
eav_defs(3_1, x/Gender, female).
eav_defs(3_1, x/Ethnicity, black).
eav_defs(3_1, y/Special, "VS+hrB−").

E3 jCode Directive(s) for Writing to and Reading From SentenceClass Database While in certain embodiments, SQL queries may be created to communicate with SentenceClasses, in a preferred embodiment, a jCode directive is created, and the jCode machine invoked, to direct the execution of SQL queries such as those in Example E1. As previously disclosed, jCode provides an environment of functional control over the execution of queries including parametrization. Thus, to instantiate a SentenceClass, sentence<-instantiateSentenceClass(dbName, "HematologicDisorders", "CLL")

a SQL query such as that in Example E1.2, will be executed under the control of a jCode directive that handles the requisite query parametrization, and the multiple requisite substitutions performed by the query.

E3.1 Directive Comprising Explicit SQL Queries—A jCode directive for implementing this function would be as follows, where SQL queries, because they are simple, and to enhance readability, are explicitly recited:

```
{
    "sentence": {
        "framingText": {
            "type": "sqlSequential",
            "spec": {
                "database": "resources",
                "queries": [
                    "SELECT Sentence_Class FROM SentenceClasses WHERE FK = '_@SentenceClass@_'"
                ],
                "outputFormat": {
                    "type": "text"
                }
            }
        },
        "variableSubstitutions":
        {
            "X": {
                "type": "sqlSequential",
                "spec": {
                    "database": "resources",
                    "queries": [
                        "SELECT _@disorder@_"
                    ],
                    "outputFormat": {
                        "type": "text"
                    }
                }
            },
            "Y": {
                "type": "sqlSequential",
                "spec": {
                    "database": "resources",
                    "queries": [
                        "SELECT h. Y from HematologicDisorders h
                            JOIN SentenceClasses s ON (h.FK = s.FK_Sentence_Class)
                            WHERE s.FK = '_@SentenceClass@_' and h.X = '_@disorder@_'"
                    ],
                    "outputFormat": {
                        "type": "text"
                    }
                }
            },
            "Z": {
                "type": "sqlSequential",
                "spec": {
                    "database": "resources",
                    "queries": [
```

```
"SELECT h.Z from hematologicDisorders h
    JOIN SentenceClasses s ON (h.FK = s.FK_Sentence_Class)
    WHERE s.FK = '_@SentenceClass@_' and h.X = '_@disorder@_'"
                ],
                "outputFormat": {
                    "type": "text"
                }
            }
        }
    }
}
``` where jCode functions are bold-faced; for details of the syntax of this jCode directive, see the "jCode Disclosure".

In executing this directive, the jCode machine first replaces any variable in the directive for which values are available in the current execution context; this context here is defined by the function intantiateSentenceClass which provides two key: value pairs, namely {"_@SentenceClass@_": "HematologicDisorders", "_@disorder@_": "CLL"}. The next step in the execution is the retrieval of the framing text according to the framingText instruction at the top of the directive. The final step, after framing text retrieval, is the substitution of variables in the framing text according to the variableSubstitution instructions. For jCode execution, a sentence class stored in the sentenceClass table would be converted to the standard framing text format, as previously disclosed, namely: Hematologic disorder _@X@_ is characterized by cell surface marker _@Y@_ with value of _@Z@_.

E3.2 Directives Referencing QueryClasses—Alternatively, a jCode directive may comprise, or reference, QueryClassTemplates, stored in a table of SentenceClassLabels, or in a separate table of QueryClassLabels, in the form of, for example, a parametrized SQL statement, as in: "SELECT Query_Class FROM QueryClasses WHERE FK='_@QueryClass@_'",
or Datalog queries such as those in Example E2. The latter queries may be programmatically instantiated and conditioned, by substituting specific values for any one or any two of the variables in a query template of the form "R(X,Y,Z)?", where R denotes a predicate, such as those in Example E2, namely: "eav", "eav_xy" or "eav_defs", and X, Y and Z denote variables.

E4 Estimating the Uncertainty of Clinical
Laboratory Results With Reference to the
SentenceClass Db E4.1 Computing Elements of 2×2 Contingency Table—With reference to the table in FIG. 11B, let A1 denote the event "Patient X has a diagnosis of CLL" and A2 the event "Patient X expresses CD19", and define a 2×2 contingency table in terms of the elements a, b, c and d in the form:

|        | A1 | Not A1 |
| ------ | -- | ------ |
| A2     | A  | B      |
| Not A2 | C  | D      |

To facilitate the evaluation of these quantities by performing SQL queries on a relational table holding clinical cases, they may be conveniently expressed in terms of Cardinalities of the corresponding subsets of the total set S with a total case count n=Card(S), namely: a=Card(A1$\wedge$A2), b=Card($\neg$A1$\wedge$A2), c=Card(A1$\wedge\neg$A2), d=Card($\neg$A1$\wedge\neg$A2), where "$\neg$" denotes negation ("NOT") and "$\wedge$" denotes conjunction ("AND").

Then, with a=Card(A1$\wedge$A2), Card(A1)=nof patients with CLL diagnosis=a+c and Card(A2)=nof patient expressing the cell surface marker CD 19=a+b, the remaining elements are obtained as follows: b=Card(A2)−Card(A1$\wedge$A2); c=Card(A1)−Card(A1$\wedge$A2) and d=Card(S)−a−b−c.

These calculations then may be conveniently performed using SQL queries on a relational database of clinical cases; to facilitate further analysis, the output of these queries is stored in the appropriate SentenceClassData tables, as illustrated in FIG. 11A.

E4.2 Estimating the Uncertainty of Laboratory Test Results—The analysis of 2×2 contingency tables includes conditional probabilities, namely:

| | |
|---|---|
| p(A1 \| A2) = a/(a + b) | # represents the positive predictive value |
| p(A1 \|$\neg$A2) = c/(c + d) | |
| p(A2 \| A1) = a/(a + c) | # represents the sensitivity |
| p(A2 \|$\neg$A1) = b/(b + d) | # represents the inverse of the specificity |

The first two of these (across rows) represent the perspective of the clinician; the latter two (along columns) represent the perspective of the pathologist.

The analysis of 2×2 contingency tables also includes statistical measures such as $\chi^2$ and Bayesian statistics measures such as the likelihood ratio (LR) or the odds ratio, etc; for example $$\chi^2 = \frac{n(a \cdot d - b \cdot c)^2}{(a+b) \cdot (a+c) \cdot (b+d) \cdot (c+d)}$$

$$LR = (a/(a+c))/(b/(b+d))$$

The accessibility of the elements a, b, c and d within a SentenceClassData table makes it convenient to construct extended Templates comprising variable whose values are functions of a, b, c and d.

E5 Prescribed New Sentence Classes: Logic
Programs

E5.1 The inference in entry #1 of the table in FIG. 12A may be compactly expressed as a rule in a Datalog program https://docs.racket-lang.org/datalog/, namely:

receives(X,T):-isTreatment(P,T),has(X,P).

where upper-case terms (following predicates) indicate variables; then, with a set of facts such as:
isTreatment(p,t).
has(x,p).
has(y,p).
has(z,p).
where arguments in lower-case terms indicate instantiated variables (that is: x, y and z denote specific patients, p denotes a specific pathogen, and t denotes a specific treatment), the query
receives(WHO, t)?
returns
receives(x, t).
receives(y, t).
receives(z, t).

The Template identifying the new SentenceClass is readily formed from the head of the rule (to the left of the operator ":-") stated above, namely: "Patient X receives treatment T".

E5.2 Similarly, the more general pattern of the inference in entry #3 of the table in FIG. 12A may be expressed in the form of a Datalog program as follows. First, capture the essence of the inference statements in these rules:
    isExposed(P,D):-receivesTxn(P,D), hasGType(P,G1), hasGType(D,G2), G1!=G2.
    isAdvImmuneRxn(P,D):-isExposed(P,D).
isGHD(P,D):-isAdvImmuneRxn(P,D).
where the variables P and D denote a patient and a donor, respectively, and G1 and G2≠G1 denote genotypes; upon introducing facts, by instantiating variables in the body of the rule, e.g.
hasGType(dx,g2).
hasGType(px,g1).
receivesTxn(px,dx).
hasGType(dy,g1).
hasGType(py,g2).
receivesTxn(py,dy).
hasGType(dz,g1).
hasGType(pz,g1).
receivesTxn(pz,dz).
where px, py, pz and dx, dy, dz respectively denote specific patients and donors, the query
isGHD(WhichP,WhichD)?
yields
isGHD(px, dx).
isGHD (py, dy).
showing that the pairings of donor dx with patient px and donor dy with patient dy, but not that of patient pz with donor dz incurs the risk of graft-vs-host disease ("GHD"), as in the latter case, and only in that case, the genotype of the donor matched that of the patient.

E5.3 Similarly, the sequence of inferences in entries #1 and #2 of the table in FIG. 12B may be expressed in terms of a logic program, as shown for the first two steps in what follows.

First, state the rule:
getsConfTest(X,C):-isConf(C,S), hasPosScreen(X,S), isScreen(S,D).
where isScreen(S,D), though redundant, is shown for clarity; upon introducing facts, by instantiating variables in the body of the rule, e.g.
isConf(c,s).
hasPosScreen (x,s).
hasPosScreen (y,s).
hasPosScreen (z,s).
the query
getsConfTest(WHO,c)?
yields the output
getsConfTest(x, c).
getsConfTest(y, c).
getsConfTest(z, c).
showing that all of patients x, y and z, with positive screens, are to receive the confirmatory test.

And continuing to entry #2 of the table in FIG. 12B, state the rule
has(X,D):-hasPosConf(X,C),isConf(C,D).
Then, upon introducing these facts
isConf(c,d).
hasPosConf(x,c).
hasPosConf(z,c).
the query
has(WHO,d)?
yields the output
has(x, d).
has(z, d).
showing that patients x and z, with positive confirmatory test, but not patient y with negative confirmatory test, have the disease d.

E6 Inferring New SentenceClasses by Generalized Transitive Closure

E6.1 Expressing the English sentences in entry #4 of the table of FIG. 12A as binary relations makes apparent that this example conforms to generalized transitive closure, namely $P(X,[S])^{\wedge}U([S],D) \rightarrow P'(X,D)$ (with [ ] denoting an array):
    P(X,[S]):="Patient X has symptoms [S]" or: has(X,[S])
    U([S],D):="Symptoms [S] identify disease D" or: isSymptoms([S],D)
    P'(X,D):="Patient X has disease D" or: has(X,D)

In this case, the predicate "has" meaningfully expresses both particular relations. i.e. P=P', as it does in the analogous case of abductive reasoning, in entry #5 of the table in FIG. 12A: here, the two relations in the apodosis express the same relation, namely has(X,D), but each relation would be instantiated with a different value of D. That is, given the particular and universal SentenceClasses in the protasis, the Template identifying the new SentenceClass is formed by replacing "symptoms [S]" by "disease D" in the particular SentenceClass of the protasis while retaining the verb "has".

In other cases, P≠P', but given P, a meaningful P' may be selected with reference to a dictionary of common usage that meaningfully expresses, in an English sentence, the relation between X and Z. Thus, for entry #1 of the table in FIG. 12A:
    P(X,Y):="Patient X has pathogen Y" or: has(X,Y)
    U(Y,T):="Pathogen Y responds to treatment T" or: isTreatment(T,Y)
    P'(X,T):="Patient X should receive treatment T" or: receives(X,T)

Here, given the particular and the universal SentenceClass in the protasis, the Template identifying the new SentenceClass is formed by replacing "pathogen Y" by "treatment T" in the particular SentenceClass of the protasis while retaining the verb "has" which, in a second step, is replaced by the more suitable verb "receives" to form" "Patient X receives treatment T"; this is understood to express standard medical practice and in that sense understood to be equivalent to "should receive".

E6.2 Protasis with Multiple Particular or Multiple Universal Relations Other statements of inference, while they may have a more complex appearance, also may conform to generalized transitive closure.

the first case, protasis with multiple particular relations, is exemplified by entry #1 in the table of FIG. 12B; to show that this conforms to generalized transitive closure, introduce relations as follows:

$P(X,S):=$"Patient X is positive for test S" or: screensPos(X,Y)

$U_1(S,D):=$"Test S screens for disease D" or: isScreen(S,D)

$U_2(C,D):=$"Test C confirms disease D" or: isConf(C,D)

$P'(X,C):=$"Patient X should receive test C" or: getsConfTest(X,C)

to obtain, by associativity:

$(P(X,S)\char`\^U_1(S,D))\char`\^U_2(C,D)\rightarrow Q(X,D)\char`\^U_2(C,D)\rightarrow Q(X,D)\char`\^U'_2(D,C)\rightarrow P'(X,C)$ where the relation $U'_2(D,C)=$"Disease D is confirmed by test C", is obtained from $U_2(C,D)$ by reordering variables. Here, while the inference statement conforms to generalized transitive closure, the Template identifying the new SentenceClass does not follow from the simple semantic rule of formation above.

the second case, protasis with multiple universal relations, is exemplified by entry #2 in the table of FIG. 12A; to show that this conforms to generalized transitive closure, introduce relations as follows:

$P(X,V,Y):=$"Patient X has variant V and takes substance Y"

$U(Y,V,E):=$"Substance Y in presence of variant V may produce adverse event E"

$P'(X,E):=$"Patient X is at risk of adverse event E"

The conditions V and Y always apply in concert, that is: $W:=V\char`\^Y=Y\char`\^V$, so that $P(X,V,Y)\char`\^U(Y,V,E)\rightarrow P(X,W)\char`\^U(W,E)\rightarrow P(X,E)$ In these cases, the programmatic inference of the new SentenceClass would proceed, in a first pass, to a Template comprising a wildcard, such as "*" to represent the intended verb, e.g., for the latter case: "Patient X*event E". The completion of this Template would require additional human or machine assistance.

E7 Handling FHIR Resources

E7.1 Abstracting & Storing Content of a FHIR Resource Content of interest may be programmatically abstracted from a FHIR resource and imported into a SentenceClassData table, as shown here for a FHIR Resource "Observation" https://www.hl7.org/fhir/observation.html, by this sequence of steps:

First, import a FHIR source document, typically in XML or JSON, parse it and traverse the parse tree (e.g. by depth-first search) to enumerate paths to all leaves, where the elements of path name prefixes correspond to the terminology defined for the resource type in question at the aforementioned link; record key-value pairs comprising path name and corresponding value for each leaf in an in-memory (temporary) table.

Next, abstract information of interest by an "abstraction and transformation query" that references the selected FHIR terms encoded in the path names, and transforms the output into E-A-V format, as illustrated here for a FHIR resource reporting the result of a test for "HDLC" (=High-Density Lipoprotein Cholesterol):

SELECT f1.propVal AS Patient, f2.propPath, f2.propVal, f3.propVal AS Resource Type
FROM hdlcFhirData f1, hdlcFhirData f2, hdlcFhirData f3
WHERE     f1.propPath='subject.reference'    AND
f3.propPath='resourceType' AND
(f2.propPath='subject.reference' OR
f2.propPath='code.text' OR
f2.propPath='valueQuantity.value' OR
f2.propPath='valueQuantity.unit' OR
f2.propPath='effectiveDateTime' OR
f2.propPath='referenceRange[0].low.value' OR
f2.propPath='referenceRange[0].high.value')

This query, preferably accessed by way of a REST-API, selects key value pairs with the FHIR terms "subject" (see hl7.org website at fhir/observation-definitions/#oobservations.subject), and at html#observation.code for the "code" and "valueQuantity", as well as the additional items in the WHERE clause and produces output in the form of the table of FIG. 13A; this query refers to the temporary in-memory table created in the previous step by 'hdlcFhirData';

Finally, insert the data into the appropriate SentenceClassData table, using the entries in column 'propVal' to populate: column 'X' with the value for the attribute "subject.reference" (="Patient/6231773"), column 'Y' with the value for "code.text" (="HDLC"); column 'Z' with the value for "valueQuantity.value" (=68); and column 'T' with the value for "effectiveDateTime"; and add a foreign key referencing the table of SentenceClassLabels; if not already present, insert the SentenceTemplate "For Mr/Mrs/Ms X, a test of lipid panel component Y produced the value Z at time T" in that table (along with an appropriate foreign key referencing the SentenceClassData), such as that of FIG. 13B; as with the E-A-V model generally, the SentenceClassData table may be supplemented by a table of attribute definitions providing, for example, attribute identifier, name and description as well as a data type; in this example, the attribute definitions might simply reproduce relevant material from the cited FHIR references which, in some cases, also include data type definitions.

E7.2 Recovering a FHIR Resource from the Semantic Database For each attribute or item recorded in the table of FIG. 13A, its place in the hierarchical organization of the original document is encoded in the form of the path name of the relevant node in the parse tree of that document. The process of reconstituting the original document, or parts thereof, may be facilitated by also identifying, as in FIG. 13A, the type of FHIR resource from which the data were abstracted: given this information, the location in the hierarchy of the complete original FHIR resource, along with additional attribute descriptions may be obtained by accessing the relevant web resource, at the links cited in Example E7.1 above. Alternatively, such information may be provided in an 'AttributeDefinitions' table.

E8 Creating an HTML Composite Document from the Semantic Database This example shows the creation of a document comprising information from three FHIR resources, namely: first and second resources of type "Observation", the first reporting test results for "HDLC" (as in Example E7.1) and the second reporting test results for "A1C"; and a third resource, of type "Patient", reporting patient-specific information (here redacted):

To record abstracted FHIR resource content in the SentenceClass database, apply to each of the three FHIR resources the steps described for the single FHIR resource in Example E7.1 and capture information of interest, for the resources of type "observation", in tables such as that in FIG. 14A, and for the resource of type "patient", in an analogous table such as that in FIG. 15A; store outputs in the appropriate SentenceClassData table (or optionally tables, if resources are to be separated by type);

To assemble the document, direct the jCode machine to execute a query to retrieve the desired key-value pairs from the appropriate SentenceClassData table(s), for example, for "hdlc", by executing this directive (referring to the SentenceClassData table by 'scd_hdlcFhirData'):

```
{
    "hdlc": {
        "type": "sqlSequential",
        "spec": {
            "database": "resources",
            "queries": [
                "SELECT propPath AS 'Key', propVal AS Value FROM sdc_hdlcFhirData"
            ],
            "default": "No data",
            "outputFormat": {
                "type": "table",
                "columnSeparator": " - ",
                "rowSeparator": "<br>"
            }
        }
    }
}
``` where jCode functions are bold-faced; for details of the syntax of this jCode directive, see the "jCode Disclosure";

Given a report configuration schema for the new XML and/or HTML document(s), the DocAssembler (in turn invoking the jCode machine, as previously disclosed), assembles a new document.

An example of an HTML document produced by this sequence of steps is shown in FIG. 15B. For the display of the individual laboratory test results in sections "Lab Result 1" and "Lab Result 2" of that document, framing texts are extracted from the table of SentenceClassLabels referenced by the individual entries in the SentenceClassData table—in this case, the framing texts happen to be identical (reflecting the fact that the imported FHIR resources were of the same type); in general, they will differ.

The display in the combined "Lab Analysis" section of the document in FIG. 15B incorporates the result of programmatic reasoning to determine whether or not the reported test results are "in range", indicated here by a check mark (and in HTML indicated by a border in green color), or "out-of-range", indicated here by the absence of a check-mark, the comment "high" (and in HTML indicated by a border in either orange or red color). In one embodiment, as in the present example, the values delimiting the reference range are abstracted from the original FHIR resource, as shown in the table of FIG. 14A; in another embodiment, these values are extracted from an 'AttributeDefinitions' table (such as that in FIG. 5B); in a further embodiment, they may be retrieved at run-time from web resources.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising" and "including" are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

REFERENCES

Herman2019: W3.org website at the page Ivan Herman, "Graph Data: RDF, Property Graphs (Results of a Workshop . . . )" W3C Track, The Web Conference 2019

Sowa1984: John Sowa, "Conceptual Structures: Information Processing in Mind and Machine", Addison-Wesley 1984

Zhang2015: Y. Zhang et al.: "Paving the COWpath: Learning and visualizing clinical pathways from electronic health record data" Journal of Biomedical Informatics, Volume 58, December 2015, Pages 186-197.

What is claimed is:

1. A semantic data acquisition, storage and presentation system comprising a SentenceClass database and a scripting language having scripts having directives or instructions for implementing and invoking SentenceClass database operations, and the scripting language further having a script execution engine, wherein:
the SentenceClass database comprises:
a table of SentenceClassLabels for storing SentenceTemplates, provided in the form of n-ary predicates or RelationalPhrases, each SentenceTemplate labeling and defining a SentenceClass;
for each defined SentenceClass in said table of SentenceClassLabels, a table of SentenceClassData, referenced in said table of SentenceClassLabels for each said defined SentenceClass, for storing one or more n-tuples for instantiating SentenceClasses, the n-tuples conforming to said SentenceTemplate and comprising items of data or knowledge, or links thereto;
the scripting language provides at least:
a functionality for populating the SentenceClass database; and
a functionality for instantiating a SentenceTemplate;
and wherein instantiating produces a Sentence presenting the items of data or knowledge in the selected n-tuple in a semantic context.

2. The system of claim 1 wherein populating comprises: inserting into the table of SentenceClassLabels at least one new SentenceTemplate; acquiring and optionally transforming items of data or knowledge from disparate designated sources and storing said items as elements of one or more n-tuples conforming to said SentenceTemplate; and inserting the one or more conforming n-tuples into a table of SentenceClassData, wherein said SentenceClassData are referenced by entries in said table of SentenceClassLabel.

3. The system of claim 1 wherein instantiating comprises: substituting for the constituent variables of said SentenceTemplate the elements of a conforming n-tuple selected from the table of SentenceClassData.

4. The system of claim 3 wherein the substituting may comprise multi-level substitution.

5. The system of claim 1 wherein the constituent variables in said SentenceTemplate may represent scalars, vectors, arrays, lists, strings including references to other SentenceTemplates, or other objects.

6. The system of claim 1 wherein the table of SentenceClassData is referenced by entries in said table of SentenceClassLabels for each said defined SentenceClass by a foreign key.

7. The system of claim 1 further comprising SentenceClass database operations including CREATE, aka CreateNewClass or createClass, comprising:
creating or otherwise providing a new SentenceTemplate; and
invoking a scripting language directive or instruction to:
as appropriate, create a new table of SentenceClassLabels;
insert said SentenceTemplate into the new or into an existing table of SentenceClassLabels; and
create a table of SentenceClassData, named after said SentenceTemplate, or an alias thereof, and having columns named after variables in said SentenceTemplate.

8. The system of claim 1 further comprising SentenceClass database operations including READ, aka readClass, comprising a scripting language directive or instruction to:
select a designated SentenceTemplate from the table of SentenceClassLabels and optionally to
select a reference to a table of SentenceClassData for instantiating said SentenceTemplate.

9. The system of claim 1 further comprising SentenceClass database operations including UPDATE, aka updateClass, comprising invoking a scripting language directive or instruction to:
update a designated SentenceTemplate in a table of SentenceClassLabels; and
update at least one existing conforming n-tuple in, or alternatively insert a new n-tuple into, a table of SentenceClassData referenced in relation to said SentenceTemplate by entries in said table of SentenceClassLabels.

10. The system of claim 1 further comprising SentenceClass database operations including DELETE, aka deleteClass, comprising invoking a scripting language directive or instruction to:
delete one designated SentenceTemplate from the table of SentenceClassLabels; and
delete the table of SentenceClassData referenced by entries in said table of SentenceClassLabels for said SentenceTemplate.

11. The system of claim 1 further comprising SentenceClass database operations including instantiateClass, comprising:
selecting one SentenceTemplate from the table of SentenceClassLabels;
selecting one conforming n-tuple from a table of SentenceClassData referenced by entries in said table of SentenceClassLabels for said SentenceTemplate; and
replacing variables in the selected SentenceTemplate by the elements of the selected n-tuple, wherein the variables may represent scalars, vectors, arrays, lists, strings including a reference to another n-ary predicate or RelationalPhrase, or other objects.

12. The system of claim 1 further comprising SentenceClass database operations including createSubclass.modify, comprising:
updating one SentenceTemplate in the table of SentenceClassLabels in accordance with Qualifiers, the Qualifiers including at least: "affirmation", "negation", "possibility", "history", and "prognosis".

13. The system of claim 1 further comprising SentenceClass database operations including createSubclass.extend, comprising:
extending one SentenceTemplate in the table of SentenceClassLabels to introduce one or more new variables to accommodate data in one or more supplemental columns of a table of SentenceClassData referenced by entries in said table of SentenceClassLabels for said SentenceTemplate, or data derived therefrom, or data derived or obtained from other sources.

14. The system of claim 1 further comprising SentenceClass database operations including createNewClass.infer, comprising:
inserting into the table of SentenceClassLabels one new n-ary predicate or RelationalPhrase, inferred from an existing n-ary predicate or RelationalPhrase.

15. The system of claim 1 further comprising SentenceClass database operations including transformClassLabel, comprising:
transforming one designated SentenceClassLabel from a first format or representation to a second format or representation, wherein the first format or representation is a RelationalPhrase having n variables and the second format or representation is an n-ary predicate, or the first format or representation is an n-ary predicate and the second the first format or representation is a RelationalPhrase having n variables.

16. The system of claim 1 wherein populating and instantiating comprises invoking one or more SentenceClass database operations.

17. The system of claim 1 wherein the scripting language is jCode, having jCode scripts including directives or instructions, and the said scripts are executed by a jCode machine.

18. The system of claim 17 wherein jCode directives or instructions are capable of invoking SQL expressions.

19. The system of claim 17 wherein jCode scripts comprising jCode directives or instructions.are invoked to implement one or more SentenceClass database operations.

20. The system of claim 17 wherein jCode scripts comprising jCode directives or instructions are invoked to abstract and store in a SentenceClass database selected content of FHIR resources, or to recover a FHIR resource from a SentenceClass database.

21. The system of claim 17 wherein jCode scripts comprising jCode directives or instructions are invoked to create a composite HTML document for presenting content abstracted from a multiplicity of FHIR resources of one or more types recorded in a sentence class database.

22. The systems of claim 17 wherein jCode scripts comprising jCode directives or instructions further provide a functionality for assembling Sentences into a hierarchically structured document in accordance with a pre-selected document configuration.

23. The systems of claim 22, wherein said document configuration is provided by augmenting entries in a table of SentenceClassLabels by a path to the intended location of Sentences in the document.

24. The system of claim 22 wherein assembling Sentences into a hierarchically structured document in accordance with a pre-selected document configuration comprises invoking jCode scripts including jCode directives or instructions.

25. The system of claim 17 wherein jCode scripts comprising jCode directives or instructions further provide a functionality for recovering event sequences from a table of SentenceClassData augmented by a column holding event or transaction times, or references thereto.

* * * * *